US012105766B2

(12) United States Patent
Lippe et al.

(10) Patent No.: US 12,105,766 B2
(45) Date of Patent: Oct. 1, 2024

(54) SYSTEM AND METHOD FOR MODIFICATION, PERSONALIZATION AND CUSTOMIZATION OF SEARCH RESULTS AND SEARCH RESULT RANKING IN AN INTERNET-BASED SEARCH ENGINE

(71) Applicant: xMentium, Inc., Denver, CO (US)

(72) Inventors: Paul Lippe, Silverthorne, CO (US); Graham Neumann, Calgary (CA); William Robert Sheerr, Chesterfield, NJ (US); Tiffany Anne Baker, Portland, OR (US); Matthew Vincent Johnson, Calgary (CA); Noah Caldwell-Gatsos, Chicago, IL (US); Nayan Mehta, Boston, MA (US)

(73) Assignee: xMentium, Inc., Denver, CO (US)

( * ) Notice: Subject to any disclaimer, the term of this patent is extended or adjusted under 35 U.S.C. 154(b) by 166 days.

(21) Appl. No.: 17/844,236

(22) Filed: Jun. 20, 2022

(65) Prior Publication Data

US 2022/0405336 A1    Dec. 22, 2022

Related U.S. Application Data

(60) Provisional application No. 63/251,800, filed on Oct. 4, 2021, provisional application No. 63/213,150, filed on Jun. 21, 2021.

(51) Int. Cl.
| G06F 16/9535 | (2019.01) |
| G06F 16/31 | (2019.01) |
| G06F 16/33 | (2019.01) |
| G06F 16/36 | (2019.01) |
| G06F 16/9538 | (2019.01) |

(52) U.S. Cl.
CPC ........ *G06F 16/9535* (2019.01); *G06F 16/316* (2019.01); *G06F 16/3344* (2019.01); *G06F 16/36* (2019.01); *G06F 16/9538* (2019.01)

(58) Field of Classification Search
CPC .............. G06F 16/9535; G06F 16/285; G06F 16/24578; G06F 16/9538
See application file for complete search history.

(56) References Cited

U.S. PATENT DOCUMENTS

2015/0161260 A1 * 6/2015 Balani ................. G06F 16/2425
                                                              707/723

* cited by examiner

*Primary Examiner* — Jay A Morrison
(74) *Attorney, Agent, or Firm* — Nancy R. Gamburd; Gamburd Law Group LLC

(57) ABSTRACT

A computer server system and method are disclosed for personalization and customization of network search results and rankings, such as for Internet searching. A representative server system comprises: a network interface to receive a query from a user and transmit return queries and search results; a data storage device having a first, lexical database having one or more compilations and templates; and one or more processors configured to access the first database and search a selected compilation using the query to generate initial search results; to comparatively score each selected parsed phrase of the initial search results, for each classification of a selected template and a selected compilation, and to output initial and final search results arranged according to the classifications and the predetermined order of the template. A representative embodiment may also include use of a second, semantic database having multi-dimensional vectors corresponding to parsed phrases, paragraphs, or clauses.

36 Claims, 15 Drawing Sheets

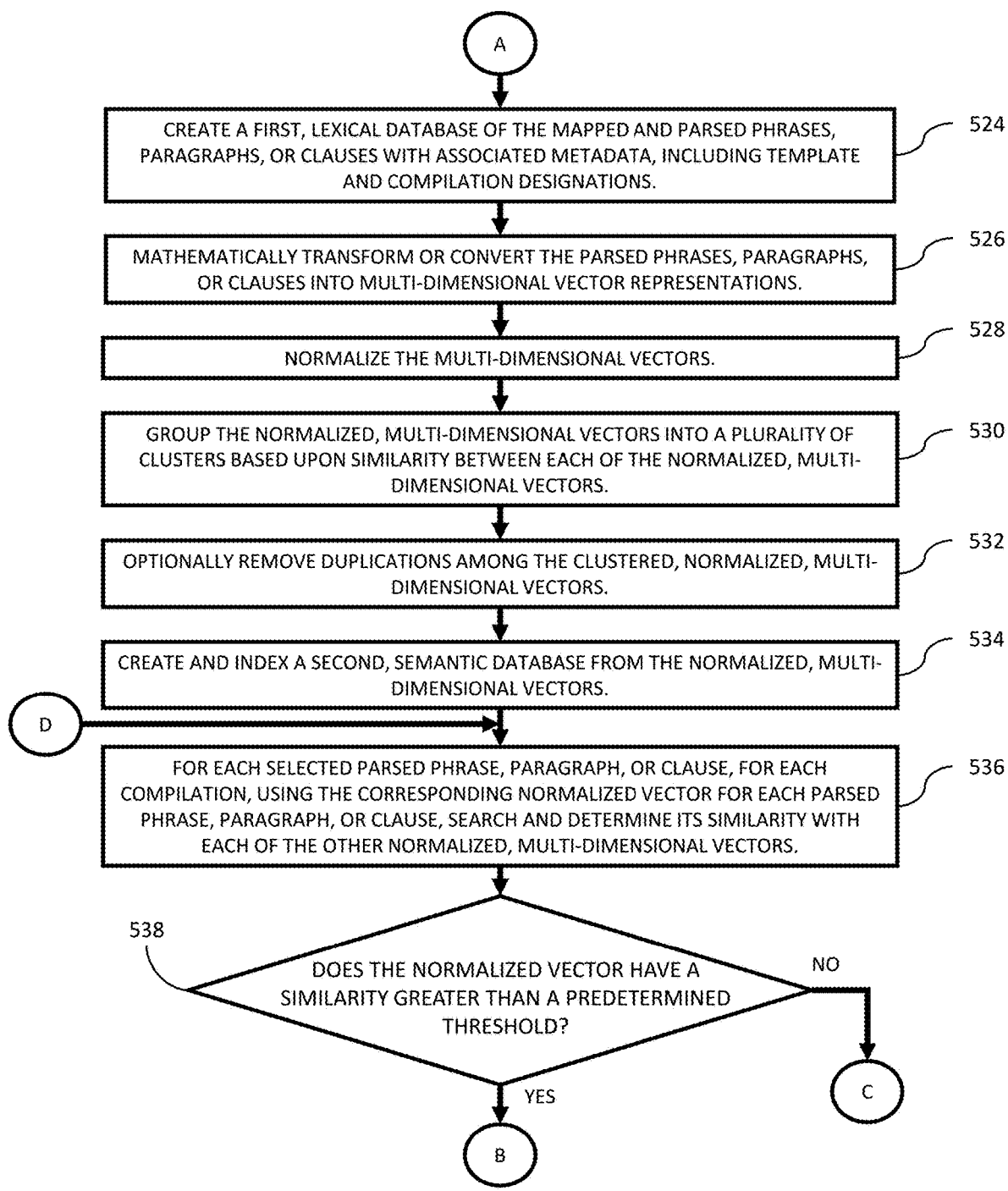

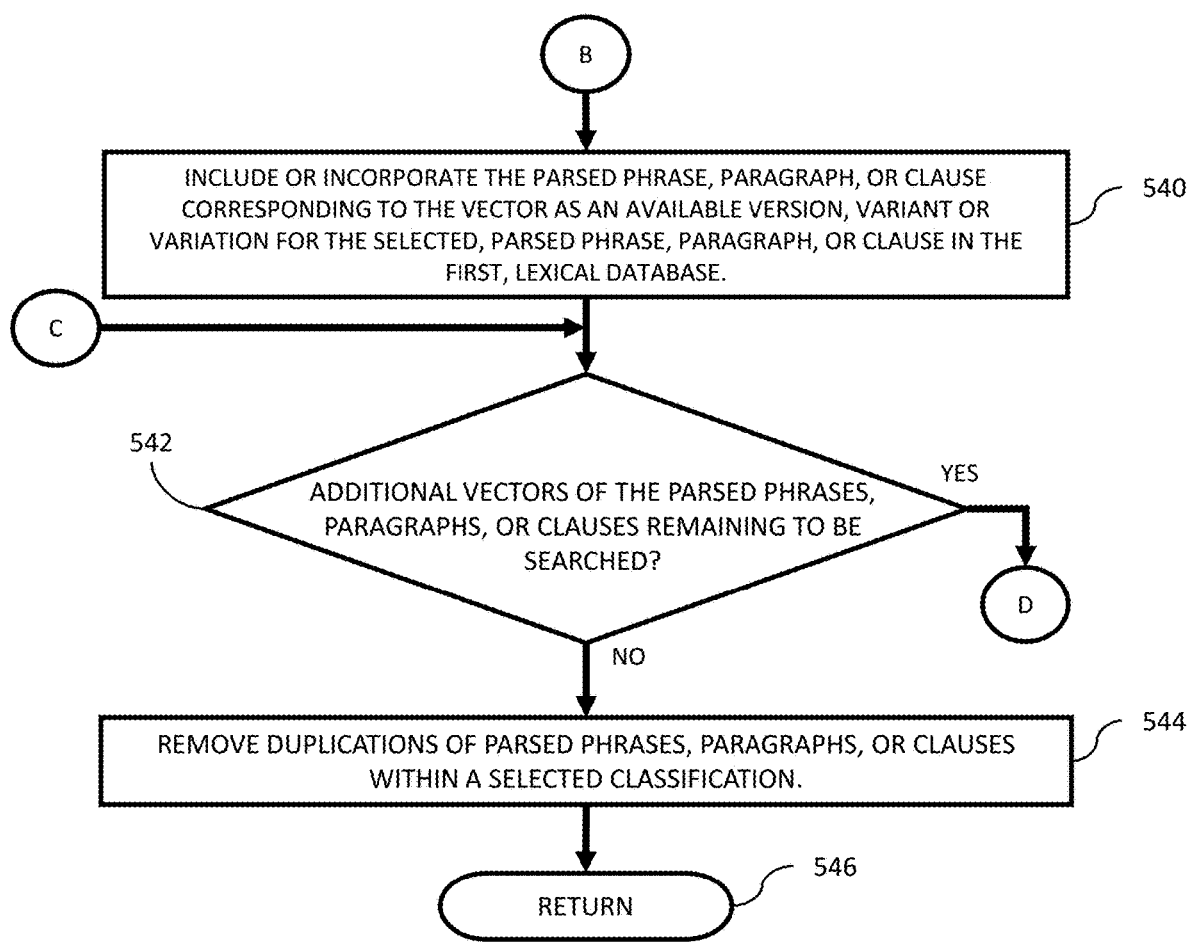

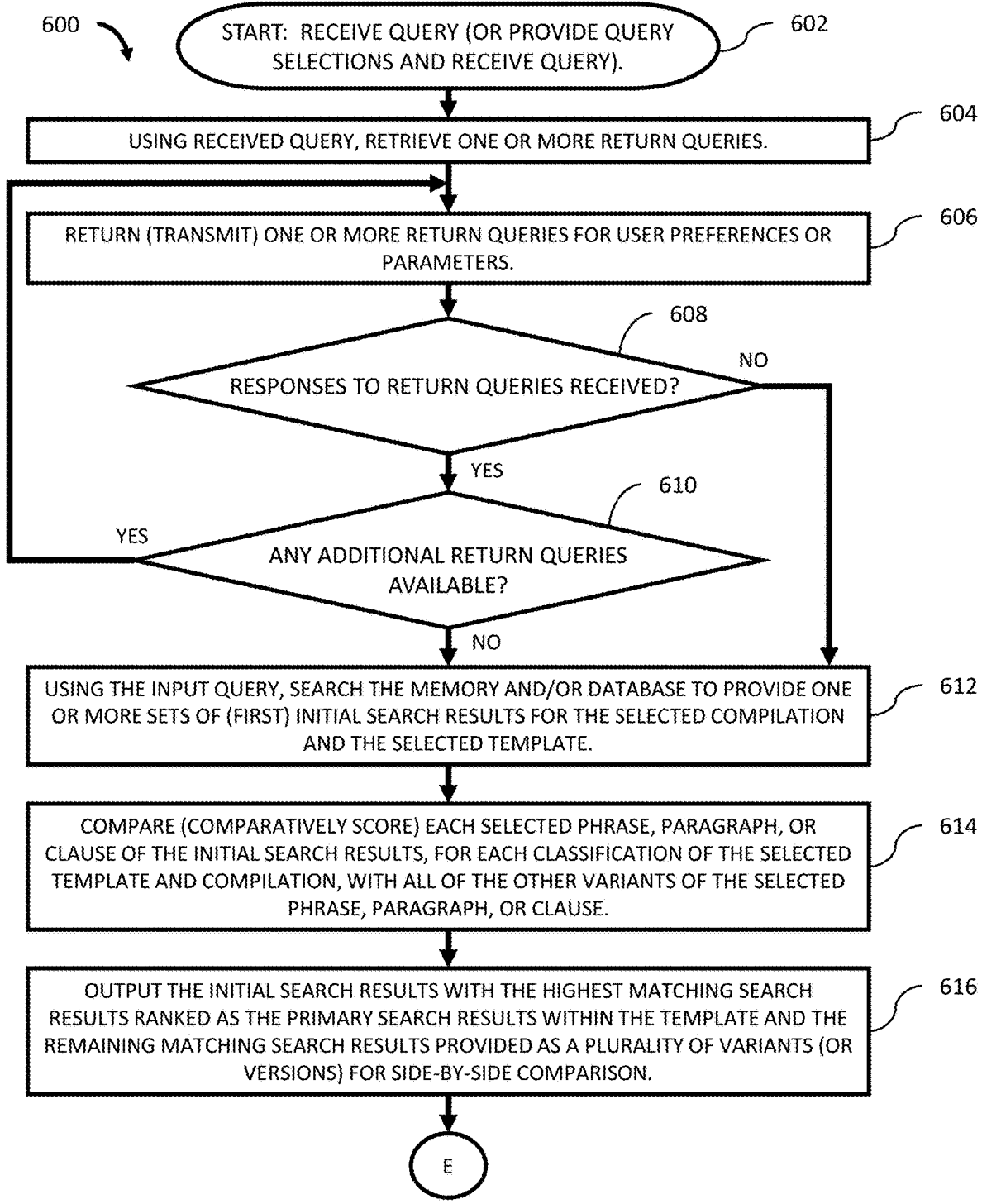

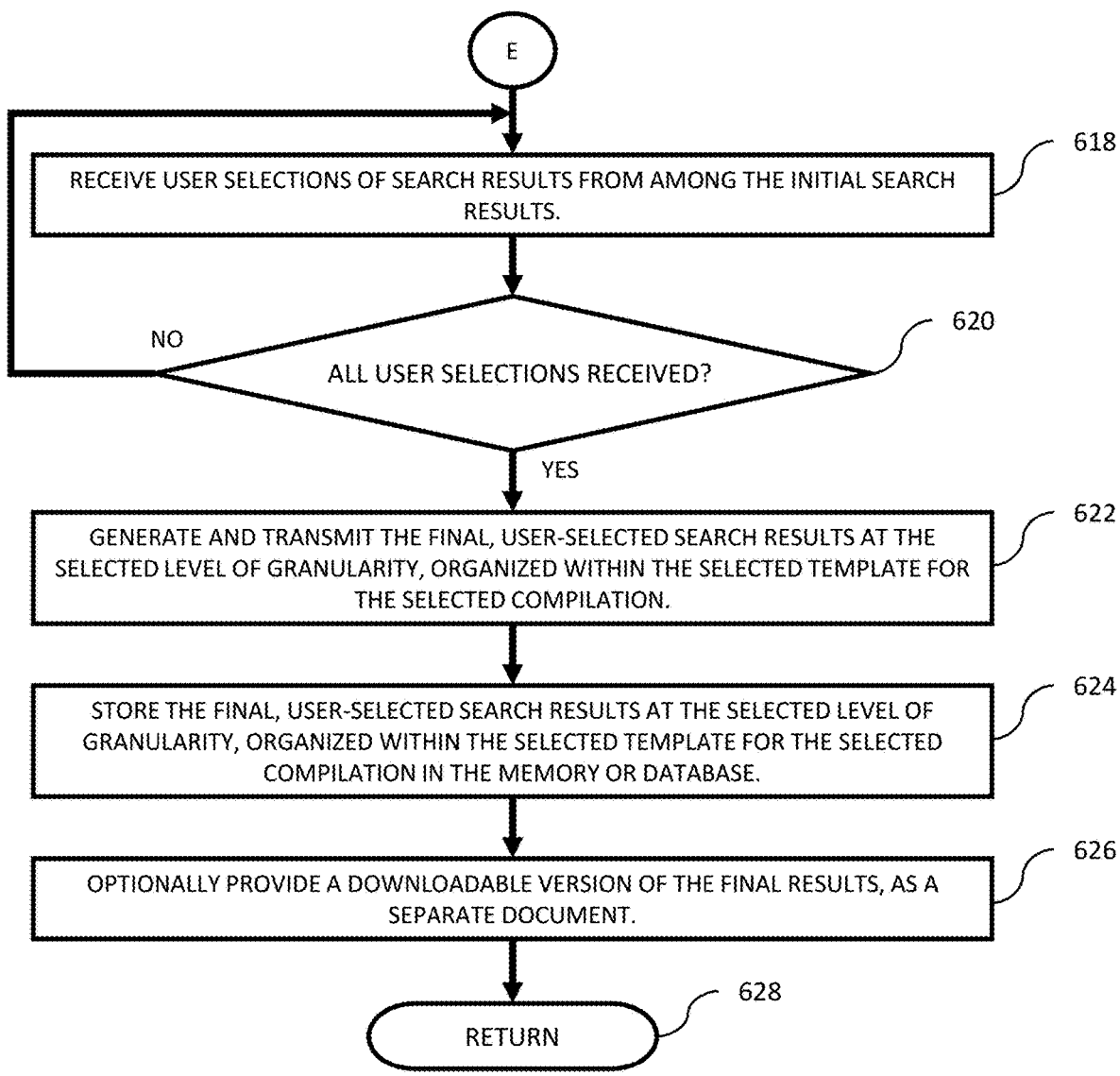

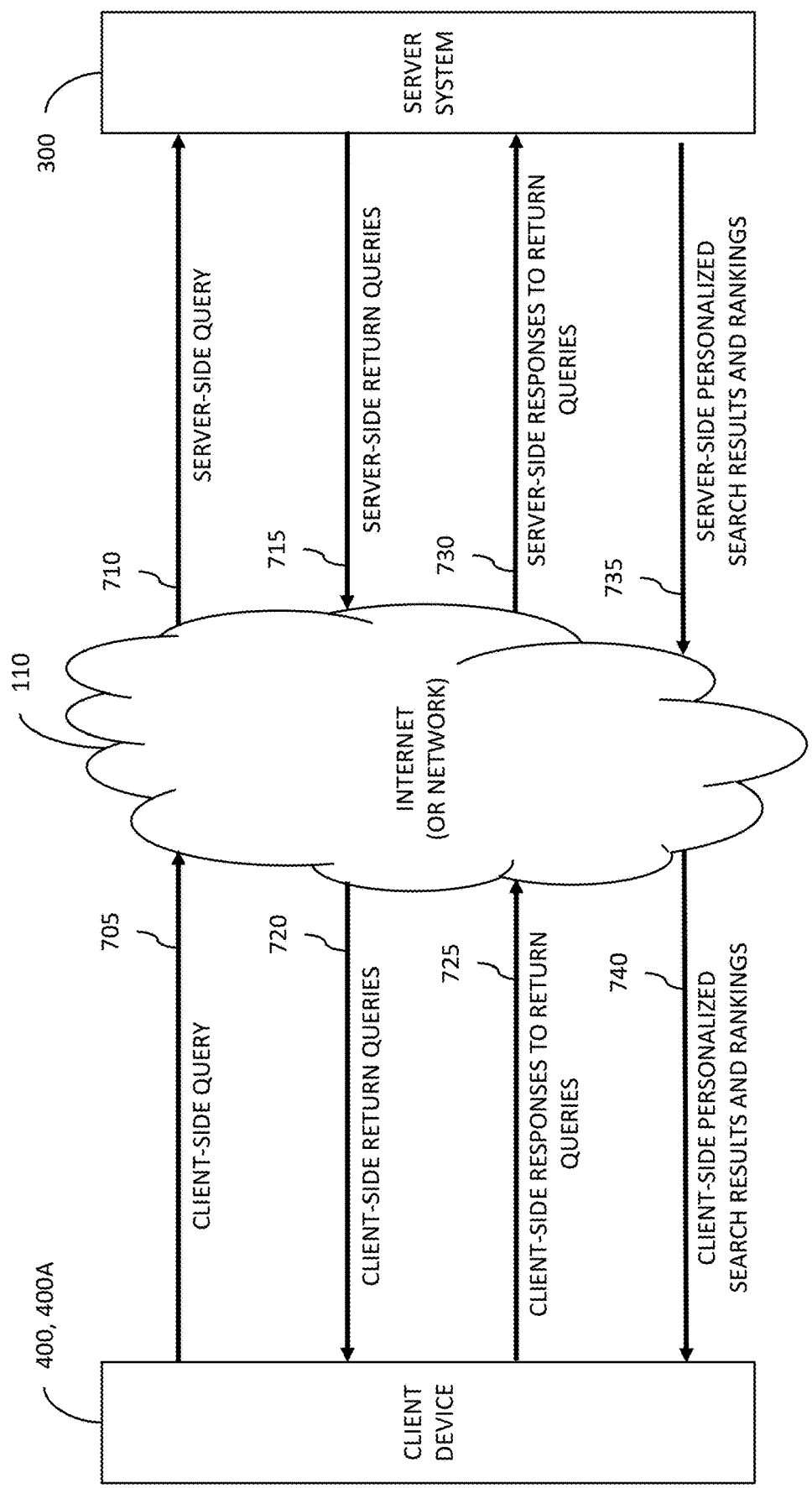

SYSTEM AND METHOD FOR MODIFICATION, PERSONALIZATION AND CUSTOMIZATION OF SEARCH RESULTS AND SEARCH RESULT RANKING IN AN INTERNET-BASED SEARCH ENGINE

CROSS-REFERENCE TO RELATED APPLICATIONS

This application is a nonprovisional of and claims priority to and the benefit of U.S. Provisional Patent Application No. 63/213,150, filed Jun. 21, 2021, and is a nonprovisional of and claims priority to and the benefit of U.S. Provisional Patent Application No. 63/251,800, filed Oct. 4, 2021, which are commonly assigned herewith, incorporated herein by reference with the same full force and effect as if set forth in their entireties herein, and with priority claimed for all commonly disclosed subject matter.

FIELD OF THE INVENTION

The present invention relates generally to online or network search engines, and more specifically to modification, personalization and customization of Internet-based search results and search result ranking in a search engine.

BACKGROUND OF THE INVENTION

The current state of the art in online search engines, generally involving word-based or phrase-based searching, is reasonably advanced in its ability to retrieve entire documents (e.g., web pages, images, files, etc.) that are responsive to the terms of a query, typically searched and retrieved using keywords contained in the query. While such search engines typically return results that accurately correspond to the search terms (keywords) of the query, the search results may not reflect the user's underlying interests and goals. In addition, such search engines usually reference many previous queries of third parties, and further are coupled to widespread analysis of network connections or "links" between different instances of information and network locations.

Additionally, using such keyword searching, too many search results and an insufficient quality of the search results may be returned by the search engine, creating several problems. First, such a large number of results are returned that the user cannot review all of the results in a reasonable period of time, or within the time allocated for review by the user. Second, these search results often contain results which are duplicates of each other or so similar that they provide little additional value to the user. Third, because of the large number of results, search providers typically return results which have been ranked according to some criteria applied by the search provider, such as by the Google page ranking system based upon the number of links to a selected web page (or website) provided by third parties as an indicator of the importance of the selected web page (or website).

In many cases, the ranked search results are distorted, both by being over-inclusive in the results returned, and by distortion of the rankings of the results. For example, keyword searching can be "gamed", with websites or documents including various keywords simply to be included in ranked results, resulting in over-inclusion of these otherwise irrelevant websites or documents in the search results. Also for example, keywords can be purchased from a search provider, often through a daily bidding process, resulting in distorted search result rankings, with the highest rankings in the search results going to the highest bidder.

Not only does this result in overall inaccuracy of the results returned, but also it increases the amount of data which must be transmitted to the user, much of which is irrelevant and which serves to obscure or bury the relevant data sought by the user of the search engine, essentially hiding the relevant "needle" in the irrelevant "haystack". The increased amount of transmitted data also tends to require larger databases for data storage, larger system server and memory requirements, and further serves to overload various network and Internet systems and effectively increase the overall search time.

In addition, this type of Internet searching may also be under-inclusive, missing the most relevant information which may not utilize the particular keyword and failing to return relevant results.

As a further result, search results returned in these over-inclusiveness, under-inclusiveness and distorted ranking situations do not provide fully actionable information. For example, this type of Internet searching also returns entire documents, many of which contain superfluous or irrelevant information, such that a collection of the actual, relevant information from a search cannot be directly compared, side-by-side, and used by the user. For example, a user may be searching for "subsets" of information, at a comparatively more granular level, such as individual clauses or paragraphs of useful information. Also for example, a user may be searching for contract clauses or paragraphs for a technology nondisclosure or transfer agreement (e.g., indemnification paragraphs, payment obligation paragraphs, term definitions, etc.) or employee handbook clauses or paragraphs (e.g., parental leave, medical benefits, etc.). Current search engines return the entire documents as results, rather than providing a collection of granular or individual clauses or paragraphs which can be compared side-by-side with each other, and selected and used by the user, such as to create a new contract or employee handbook.

These problems of over-inclusiveness, under-inclusiveness and distorted rankings creates additional problems in many industries. For example, in Internet-based keyword searching, an end result of returning hundreds to thousands to hundreds of thousands of entire documents, when the user is merely searching for subsets of information as previously mentioned, cannot be effectively winnowed or reduced through additional keyword searching, and again means that the user cannot review all of the document results in a reasonable period of time, or within the time allocated for review (e.g., the time interval between receipt of the search results and when a resulting document, such as a contract or handbook, is needed for dissemination). For example, so many documents may be received which would require hundreds of person-hours to review, while only several (e.g., 2-3) person-hours may be allocated to review the retrieved documents, making a thorough review effectively impossible.

A need remains, therefore, for a system and method for personalization of and customization of Internet-based search results and search result ranking in a search engine. Such a search engine should provide results promptly at a user-selectable, granular level to provide the opportunity for direct, side-by-side comparison, and should produce actionable results, such as returning a reasonable number of search results of high quality, that are directly relevant to the personalized search and without being under-inclusive, and further which can be thoroughly reviewed by the user within the user's time allocation. Such a search engine should also result in a decrease in the amount of data required to be stored and decrease the corresponding size of the resulting databases, further serving to decrease the amount of data required to be transmitted and reduce the system load. In addition, such a search engine system and method should incorporate time sensitivity in the personalized search results and provide actionable information.

SUMMARY OF THE INVENTION

The representative or exemplary embodiments of the present invention provide numerous advantages. Representative embodiments provide for a technical, artificial intelligence ("AI") solution to an Internet-centric problem of over-inclusiveness of search results, under-inclusiveness of relevant information, and distorted rankings of search results using the prior art keyword searching. The representative embodiments automate the Internet-based searching and selection processes using highly relevant, user-determined characteristics and user-customizable parameters, resulting in personalization of search results and search result ranking. The representative embodiments employ artificial intelligence to "match" information to a user and provide exactly the information the user wants or needs (if available) at the point in time wanted or needed, without inundating the user with thousands of responses or documents which the user cannot possibly review in a reasonable or allocated time, and without being under-inclusive of highly relevant search results.

As a result, the representative embodiments improve the functioning of Internet-based searches, providing highly personalized search results and search result rankings, thereby dramatically decreasing the amount of search time required for a user to discover relevant and actionable information.

As a further result, the representative embodiments improve the functioning of Internet-based searches, decreasing the amount of data which must be transmitted to provide the highly personalized search results and search result rankings, decreasing the size of the databases required for data storage, decreasing the system server and memory requirements, and further serving to decrease the load of the various system components, such as the Internet-based servers and routers.

A representative embodiment provides comparatively granular search results within a selected or constrained context. For example, a representative embodiment provides various parameter selections to a user, which determine this selected or constrained context (e.g., as a compilation), and which determine a selected template for the organization and presentation of the comparatively granular, final search results. This type of Internet searching returns granular search results which can be directly compared, side-by-side, and used and selected by the user. For example and without limitation, search results returned to the user may be individual clauses or paragraphs of useful information, such as contract clauses or paragraphs or employee handbook clauses or paragraphs, as mentioned above, with each type of clause or paragraph grouped together for side-by-side review, comparison and selection by the user, such as to create a new contract or employee handbook or for any other purposes, including scientific, engineering, and other research and development purposes. The final, customized (user-selected) search results are then organized and output to the user based upon the customizable, user-selected template, thereby providing immediately useable and actionable search results.

A representative embodiment provides a computer server system coupleable to a network for personalization of network search results and search result rankings provided to a user. The representative embodiment of the server system comprises: a network input and output interface for network data transmission and reception, the network input and output interface configured to receive an input query from the user via the network; to transmit a return query, of a plurality of return queries, to the user via the network; to receive a response to the return query from the user via the network; and to transmit search results to the user via the network; at least one data storage device configured to store a first, lexical database having one or more compilations, one or more templates, and the plurality of return queries; each compilation of the one or more compilations comprising a plurality of parsed phrases, paragraphs, or clauses; and each template of the one or more templates comprising a plurality of classifications having a predetermined order; and one or more processors coupled to the at least one data storage device and to the network input and output interface, the one or more processors configured to access the first database and using the input query, to select the return query for transmission; to search a selected compilation of the one or more compilations stored in the first database using the at least one query to generate a first plurality of initial search results; to comparatively score each selected parsed phrase, paragraph, or clause of the first plurality of initial search results, for each classification of a selected template and a selected compilation, and to output the first plurality of initial search results arranged according to the plurality of classifications and the predetermined order of the selected template.

In a representative embodiment, the one or more processors may be further configured to output the first plurality of initial search results with the highest matching or highest scoring search results, for each classification of the plurality of classifications, ranked as primary search results within the template, and any remaining matching search results provided, for each classification of the plurality of classifications, as a plurality of variants or versions for side-by-side comparison.

In a representative embodiment, the network input and output interface may be further configured to receive a plurality of user selections of search results from among the initial search results. For such a representative embodiment, the one or more processors are further configured to generate, for transmission by the network input and output interface to the user, a set of final user-selected search results arranged according to the plurality of classifications and the predetermined order of the selected template.

Also in a representative embodiment, the first plurality of initial search results and the set of final user-selected search results have a user selected level of granularity. Also in a representative embodiment, the one or more processors may be further configured to generate, for transmission by the network input and output interface to the user, a downloadable file having the set of final user-selected search results arranged according to the plurality of classifications and the predetermined order of the selected template.

In a representative embodiment, the at least one data storage device may be further configured to store a second, semantic database having a plurality of multi-dimensional vectors, each multi-dimensional vector of the plurality of multi-dimensional vectors corresponding to a selected parsed phrase, paragraph, or clause of the plurality of parsed phrases, paragraphs, or clauses. For such a representative embodiment, the one or more processors may be further configured to transform the input query into a corresponding multi-dimensional vector and to search the second, semantic database for semantic similarity to the corresponding multi-dimensional vector, and generate a second plurality of initial search results.

For example, the semantic similarity may be determined as a cosine similarity or cosine distance between a first multi-dimensional vector u and a second multi-dimensional vector v, of the plurality of multi-dimensional vectors, as an inner dot product between the first and second multi-dimensional vectors calculated as: $u \cdot v = |u||v| \cos \theta = \Sigma_{i=1}^{n} a_n b_n$.

In a representative embodiment, the one or more processors may be further configured to transform the second plurality of initial search results from a vector representation to a corresponding plurality of parsed phrases, paragraphs, or clauses and include the corresponding plurality of parsed phrases, paragraphs, or clauses in the first plurality of initial search results.

In another representative embodiment, the one or more processors may be further configured to transform each parsed phrase, paragraph, or clause, of the plurality of parsed phrases, paragraphs, or clauses, into a corresponding multidimensional vector to form a plurality of multi-dimensional vectors and to store the plurality of multi-dimensional vectors in a second, semantic database in the at least one data storage device. For such a representative embodiment, the one or more processors may be further configured to determine semantic similarity of each multi-dimensional vector of the plurality of multi-dimensional vectors to all other multi-dimensional vectors of the plurality of multi-dimensional vectors of the second, semantic database to generate, for each classification of the plurality of classifications, a plurality of semantically similar multi-dimensional vectors. For such a representative embodiment, the one or more processors may be further configured to transform the plurality of semantically similar multi-dimensional vectors from a vector representation to a corresponding plurality of semantically similar parsed phrases, paragraphs, or clauses and include the corresponding plurality of semantically similar parsed phrases, paragraphs, or clauses in the first, lexical database, for each classification of the plurality of classifications.

In a representative embodiment, the search of the selected compilation of the one or more compilations stored in the first, lexical database includes searching the corresponding plurality of semantically similar parsed phrases, paragraphs, or clauses to generate the first plurality of initial search results.

In a representative embodiment, the network input and output interface may be further configured to receive input data for a selected compilation of the one or more compilations, and wherein the one or more processors are further configured to parse the input data into the plurality of parsed phrases, paragraphs, or clauses; to map the plurality of parsed phrases, paragraphs, or clauses to the plurality of classifications; and to generate the first, lexical database having the mapped plurality of parsed phrases, paragraphs, or clauses for the selected compilation. In a representative embodiment, the one or more processors may be further configured to recognize a plurality of dynamic fields and extract dynamic content from the plurality of parsed phrases, paragraphs, or clauses. In a representative embodiment, the one or more processors may be further configured to extract the plurality of classifications from the input data.

Also in a representative embodiment, the one or more processors may be further configured to generate metadata for each parsed phrase, paragraph, or clause of the plurality of parsed phrases, paragraphs, or clauses, the metadata comprising one or more types of data selected from the group consisting of: an order, a name, a font, a style, a header, a footer, a weighting, a tagging of one or more variants, a confidence level, a template designation, a compilation designation, a placeholder, a cross-reference, an inline references, and combinations thereof.

A representative embodiment of a computer server system coupleable to a network for personalization of network search results and search result rankings provided to a user is disclosed, with the representative server system embodiment comprising: a network input and output interface for network data transmission and reception, the network input and output interface configured to receive an input query from the user via the network; to transmit a return query, of a plurality of return queries, to the user via the network; to receive a response to the return query from the user via the network; to transmit a first plurality of initial search results to the user via the network; to receive a plurality of user selections of search results from among the first plurality of initial search results; and to transmit a set of final user-selected search results to the user via the network; at least one data storage device configured to store a first, lexical database having one or more compilations, one or more templates, and the plurality of return queries; each compilation of the one or more compilations comprising a plurality of parsed phrases, paragraphs, or clauses; and each template of the one or more templates comprising a plurality of classifications having a predetermined order; and one or more processors coupled to the at least one data storage device and to the network input and output interface, the one or more processors configured to access the first database and using the input query, to select the return query for transmission; to search a selected compilation of the one or more compilations stored in the first database using the at least one query to generate a first plurality of initial search results; to comparatively score each selected parsed phrase, paragraph, or clause of the first plurality of initial search results, for each classification of a selected template and a selected compilation, and to output the first plurality of initial search results arranged according to the plurality of classifications and the predetermined order of the selected template with the highest matching or highest scoring search results, for each classification of the plurality of classifications, ranked as primary search results within the template, and any remaining matching search results provided, for each classification of the plurality of classifications, as a plurality of variants or versions for side-by-side comparison; and to generate, for transmission by the network input and output interface to the user, a set of final user-selected search results arranged according to the plurality of classifications and the predetermined order of the selected template.

A representative embodiment of a computer server-implemented method is also disclosed for personalization of network search results and search result rankings provided to a user, with the representative method embodiment comprising: using the computer server, receiving an input query from the user via the network; in response to the input query, using the computer server, accessing at least one data storage device and selecting a return query, of a plurality of return queries; using the computer server, transmitting the return query to the user via the network; using the computer server, receiving a response to the return query from the user via the network; using the computer server, accessing a first, lexical database and using the input query, searching a selected compilation of one or more compilations stored in the first, lexical database to generate a first plurality of initial search results, each compilation of the one or more compilations comprising a plurality of parsed phrases, paragraphs, or clauses; using the computer server, comparatively scoring each selected parsed phrase, paragraph, or clause of the first plurality of initial search results, for each classification of a plurality of classifications of a selected template of one or more templates stored in the first, lexical database; and using the computer server, outputting the first plurality of initial search results arranged according to the plurality of classifications and a predetermined order of the selected template.

In a representative embodiment, the computer server-implemented method may further comprise: using the computer server, outputting the first plurality of initial search results with the highest matching or highest scoring search results, for each classification of the plurality of classifications, ranked as primary search results within the template, and providing any remaining matching search results, for each classification of the plurality of classifications, as a plurality of variants or versions for side-by-side comparison.

In a representative embodiment, the computer server-implemented method may further comprise: using the computer server, receiving a plurality of user selections of search results from among the initial search results. In such a representative embodiment, the computer server-implemented method may further comprise: using the computer server, generating and transmitting to the user a set of final user-selected search results arranged according to the plurality of classifications and the predetermined order of the selected template. In such a representative embodiment, the computer server-implemented method may further comprise: the first plurality of initial search results and the set of final user-selected search results have a user selected level of granularity.

In a representative embodiment, the computer server-implemented method may further comprise: using the computer server, generating and transmitting to the user a downloadable file having the set of final user-selected search results arranged according to the plurality of classifications and the predetermined order of the selected template.

In a representative embodiment, the computer server-implemented method may further comprise: using the computer server, mathematically transforming the input query into a corresponding multi-dimensional vector of a plurality of multi-dimensional vectors stored in a second, semantic database, each multi-dimensional vector of the plurality of multi-dimensional vectors corresponding to a selected parsed phrase, paragraph, or clause of the plurality of parsed phrases, paragraphs, or clauses; and using the computer server, searching the second, semantic database for semantic similarity to the corresponding multi-dimensional vector and generating a second plurality of initial search results. For example, using the computer server, the semantic similarity may be determined as a cosine similarity or cosine distance between a first multi-dimensional vector u and a second multi-dimensional vector v, of the plurality of multi-dimensional vectors, as an inner dot product between the first and second multi-dimensional vectors calculated as: $u \cdot v = |u||v|\cos \theta = \Sigma_{i=1}^{n} a_n b_n$. In a representative embodiment, the computer server-implemented method may further comprise: using the computer server, transforming the second plurality of initial search results from a vector representation to a corresponding plurality of parsed phrases, paragraphs, or clauses and including the corresponding plurality of parsed phrases, paragraphs, or clauses in the first plurality of initial search results.

In a representative embodiment, the computer server-implemented method may further comprise: using the computer server, mathematically transforming each parsed phrase, paragraph, or clause, of the plurality of parsed phrases, paragraphs, or clauses, into a corresponding multidimensional vector to form a plurality of multi-dimensional vectors and to store the plurality of multi-dimensional vectors in a second, semantic database in the at least one data storage device. In such a representative embodiment, the computer server-implemented method may further comprise: using the computer server, determining a semantic similarity of each multi-dimensional vector of the plurality of multi-dimensional vectors to all other multi-dimensional vectors of the plurality of multi-dimensional vectors of the second, semantic database and generating, for each classification of the plurality of classifications, a plurality of semantically similar multi-dimensional vectors. In such a representative embodiment, the computer server-implemented method may further comprise: using the computer server, transforming the plurality of semantically similar multi-dimensional vectors from a vector representation to a corresponding plurality of semantically similar parsed phrases, paragraphs, or clauses and including the corresponding plurality of semantically similar parsed phrases, paragraphs, or clauses in the first, lexical database, for each classification of the plurality of classifications. For such a representative embodiment, the search of the selected compilation of the one or more compilations stored in the first, lexical database may include searching the corresponding plurality of semantically similar parsed phrases, paragraphs, or clauses to generate the first plurality of initial search results.

In a representative embodiment, the computer server-implemented method may further comprise: using the computer server, receiving input data for a selected compilation of the one or more compilations; using the computer server, parsing the input data into the plurality of parsed phrases, paragraphs, or clauses; using the computer server, mapping the plurality of parsed phrases, paragraphs, or clauses to the plurality of classifications; and using the computer server, generating the first, lexical database having the mapped plurality of parsed phrases, paragraphs, or clauses for the selected compilation. In such a representative embodiment, the computer server-implemented method may further comprise: using the computer server, recognizing a plurality of dynamic fields and extracting dynamic content from the plurality of parsed phrases, paragraphs, or clauses.

In a representative embodiment, the computer server-implemented method may further comprise: using the computer server, extracting the plurality of classifications from the input data.

In a representative embodiment, the computer server-implemented method may further comprise: using the computer server, generating metadata for each parsed phrase, paragraph, or clause of the plurality of parsed phrases, paragraphs, or clauses, the metadata comprising one or more types of data selected from the group consisting of: an order, a name, a font, a style, a header, a footer, a weighting, a tagging of one or more variants, a confidence level, a template designation, a compilation designation, a placeholder, a cross-reference, an inline reference, and combinations thereof.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 5A, 5B, and 5C (collectively referred to as FIG. 5) is a flow diagram illustrating an exemplary or representative method embodiment for generation of one or more databases and a plurality of compilations for Internet or network-based search.

FIGS. 6A and 6B (collectively referred to as FIG. 6) is a flow diagram illustrating an exemplary or representative method embodiment for personalization of search results and search result output in a search engine.

FIG. 7 is a block diagram illustrating exemplary or representative message transmission sequences for personalization of search results and search result output in a search engine.

DETAILED DESCRIPTION OF REPRESENTATIVE EMBODIMENTS

Figure 1:
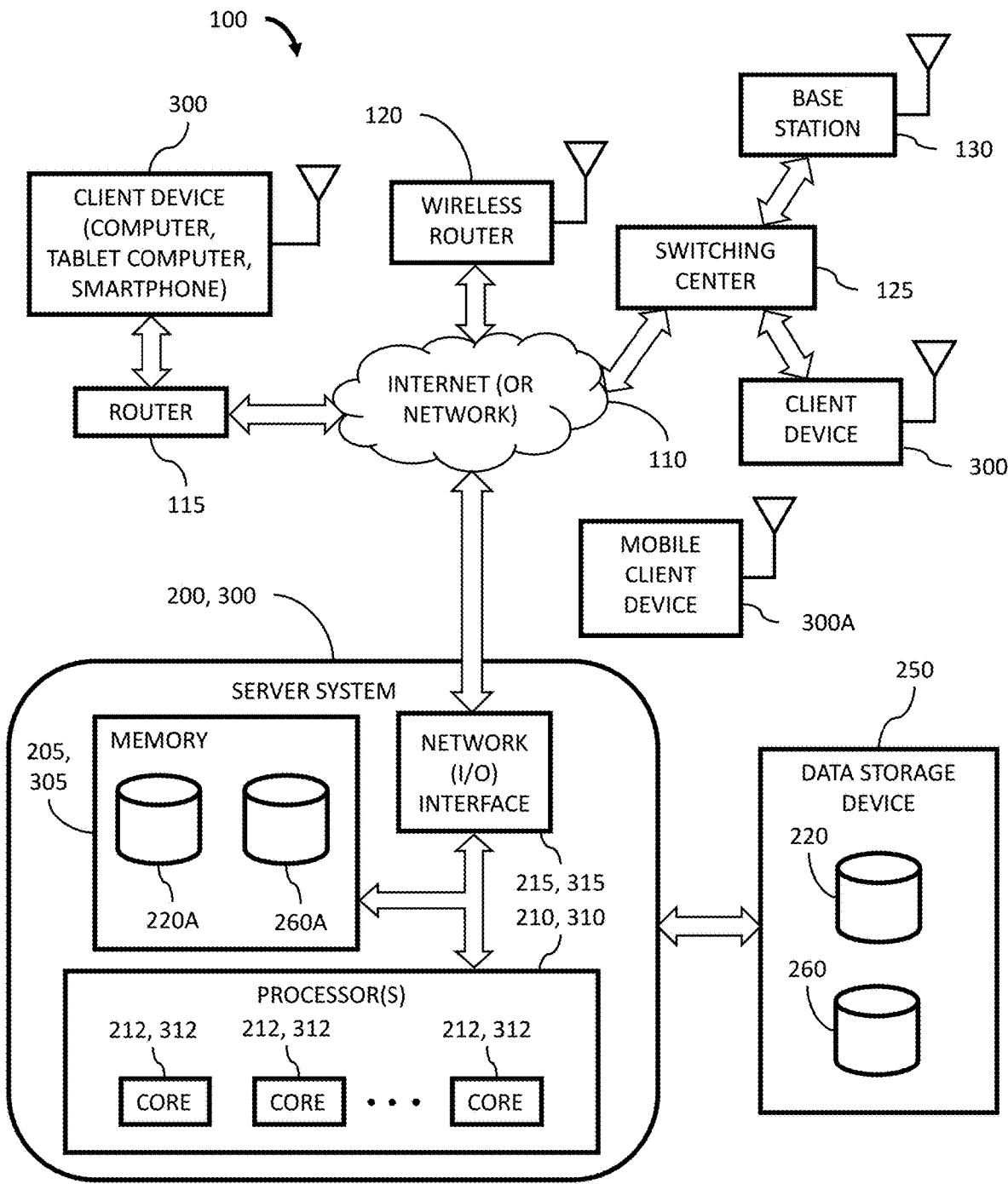
FIG. 1 is a block diagram illustrating an exemplary or representative system embodiment.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

As described in greater detail below, the representative embodiments provide a technical, artificial intelligence solution to an Internet-centric problem of over-inclusiveness of search results and distorted rankings of search results using the prior art keyword searching. Just as a computing system uses sensor information and reverse-Bayesian computations to enable driving an automobile without human control, the representative embodiments automate the Internet-based searching and selection processes using highly relevant, user-determined characteristics and user-customizable parameters, resulting in personalization and customization of search results and search result ranking. Stated another way, the representative embodiments employ artificial intelligence and search personalization or customization to "match" information to a user and provide the relevant and ranked information the user wants or needs (if available) at the point in time wanted or needed, without inundating the user with thousands of responses or documents which the user cannot possibly review in a reasonable or allocated time.

A significant feature of the representative embodiments is the use of two different types of databases, which improves the accuracy and inclusiveness of the search results, without creating excessive duplication of results. A first database 220 is created and utilized, which comprises a lexical database, such as for text (string) search and comparison using words, keywords, sentences, phrases, paragraphs, and other character strings. A second database 260 is created and utilized, with the second database 260 comprising a semantic, vector database, for search and comparison utilizing mathematical functions across multi-dimensional, normalized vector representations, with the results of the vector searching then incorporated into the first, lexical database 220, as discussed in greater detail below. The second, semantic database 260 may also be utilized directly in query searching, as an option, discussed in greater detail below.

A significant feature of the representative embodiments is the "pre-searching" of both of the first database 220 and the second database 260 for a selected subject, topic, field, or feature to create a corresponding "compilation" of search results for the selected subject, topic, field, or feature, resulting in a plurality of compilations corresponding to a plurality of different selected subjects, topics, fields, or features. The user may then select a particular compilation from the plurality of compilations for use in the search, resulting in highly accurate, relevant, and extremely fast return search results.

A representative embodiment provides comparatively granular search results within this compilation, providing selected or constrained context for searching. For example, a representative embodiment provides various parameter selections to a user, which determine this selected or constrained context (or compilation), and which determine a selected template for the organization and presentation of the comparatively granular, final search results. This type of Internet (or network) searching returns granular search results which can be directly compared, side-by-side, and used and selected by the user. For example, search results returned to the user may be individual clauses or paragraphs of useful information, such as contract clauses or paragraphs or employee handbook clauses or paragraphs, as mentioned above, with each type of clause or paragraphed grouped together for side-by-side review, comparison and selection by the user, such as to create a new contract or employee handbook. The final, customized (user-selected) search results are then organized and output to the user based upon the customizable, user-selected template, thereby providing immediately useable and actionable search results.

While specific examples are illustrated which are relevant to the creation of an entire document containing selections of each of the search results as organized into a selected template, those having skill in the art will recognize that the representative systems, apparatuses, and methods disclosed herein may be extended and applied to virtually any field or endeavor, for any kind or type of Internet (or other network) search, for any subject or topic.

In addition, the user-determined characteristics and user-customizable parameters are stored in one or more memory storage devices of the representative embodiments and persist over a predetermined period of time, such as several months. As a result, the user-determined characteristics and user-customizable parameters can be utilized repeatedly and periodically (e.g., every time a user logs in to the representative system embodiments and/or when searches are run periodically or at regular intervals by the representative system embodiments).

As described in greater detail below, the representative embodiments improve the functioning of Internet-based searches, providing highly personalized and customizable search results and search result rankings, thereby dramatically decreasing the amount of search time required for a user to discover relevant and actionable information. Such representative embodiments also result in a decrease in the amount of data required to be stored and decrease the corresponding size of the resulting databases, further serving to decrease the amount of data required to be transmitted and reduce the system load. In addition, representative embodiments incorporate time sensitivity in the personalized search results and provide corresponding user notifications.

Figure 2:
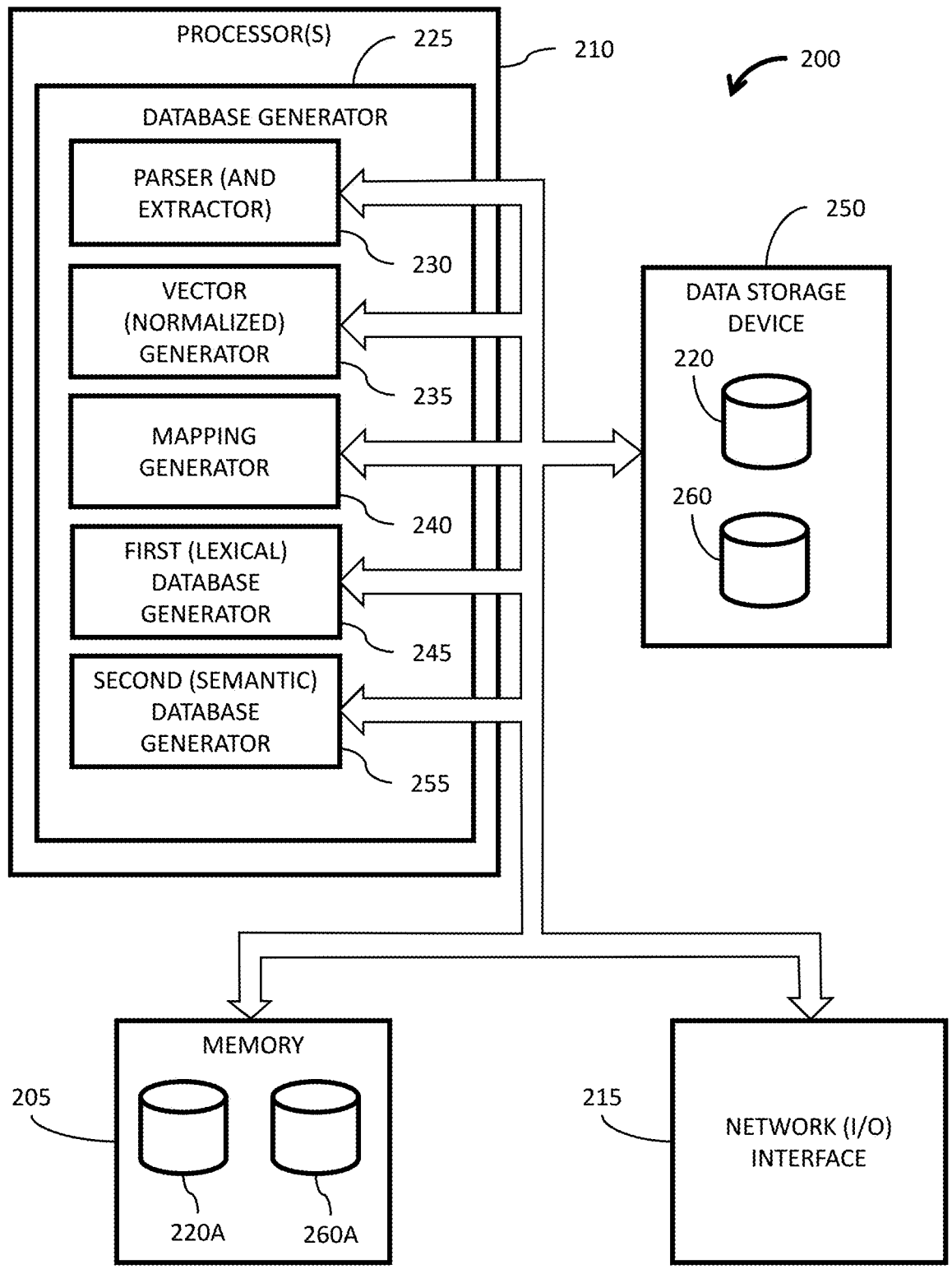
FIG. 2 is a block diagram illustrating an exemplary or representative server system or apparatus embodiment for database generation.
Figure 3:
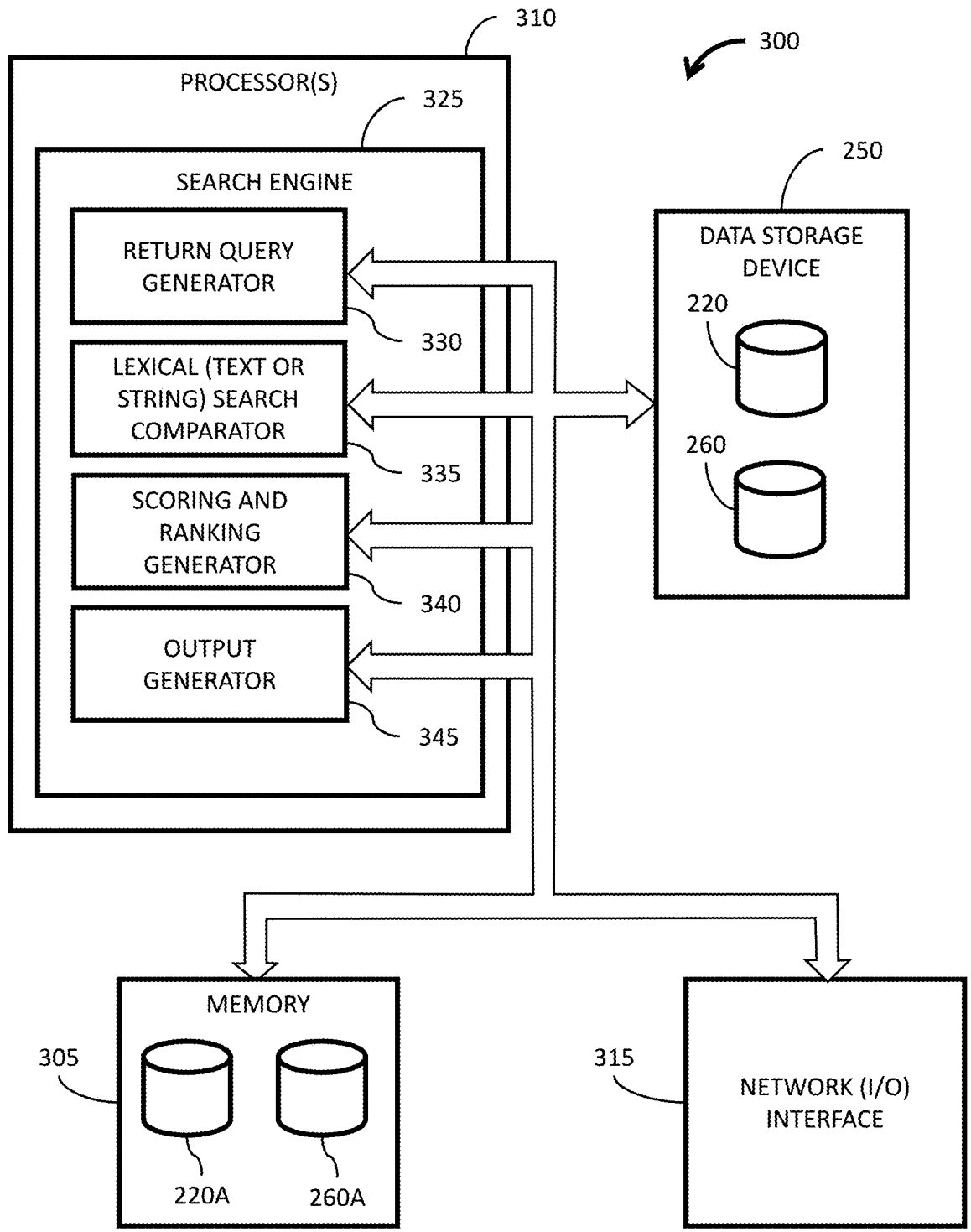
FIG. 3 is a block diagram illustrating an exemplary or representative server system or apparatus embodiment for Internet or network-based search.
Figure 4:
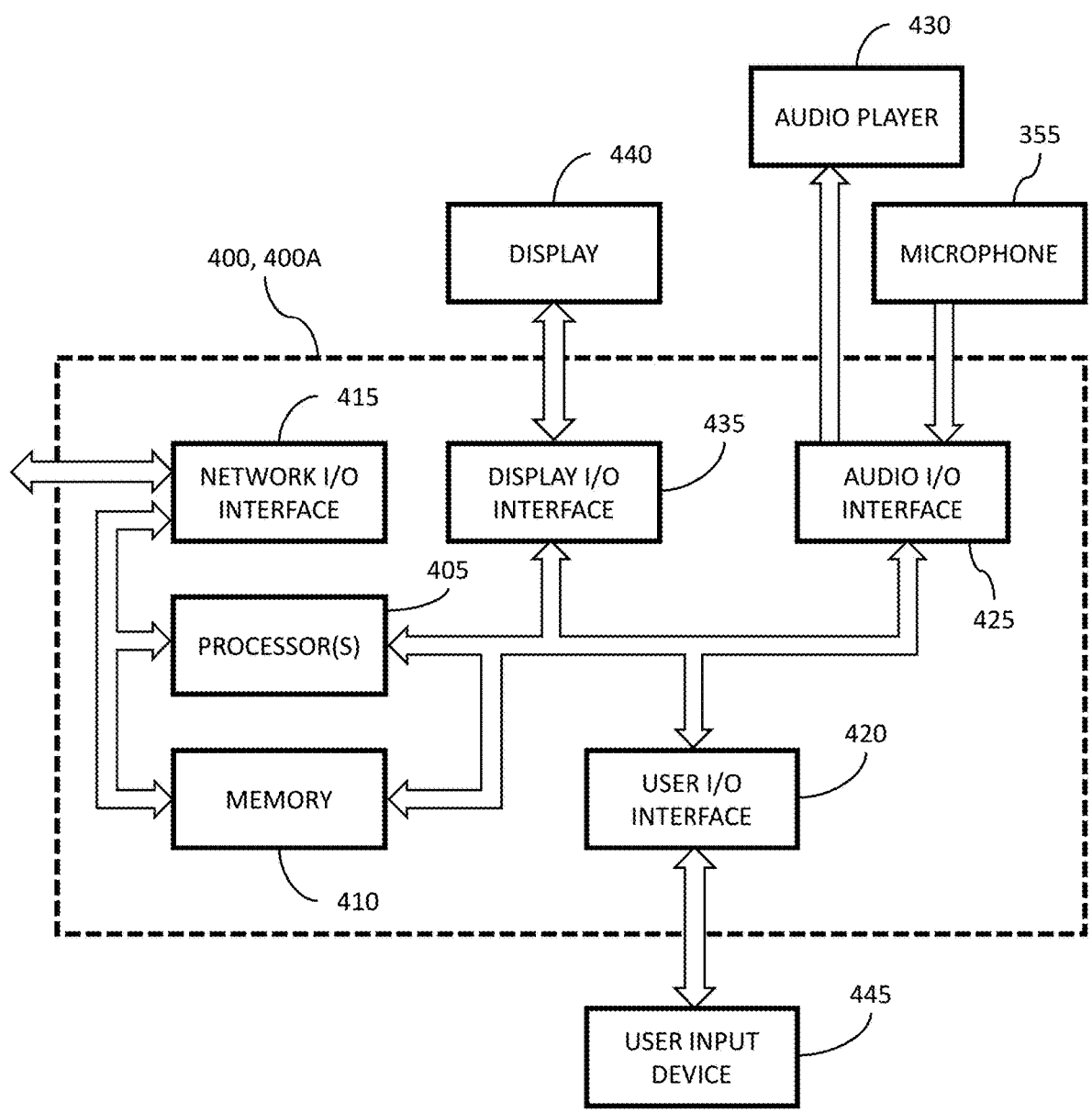
FIG. 4 is a block diagram illustrating an exemplary or representative client device embodiment.
Figure 5A:
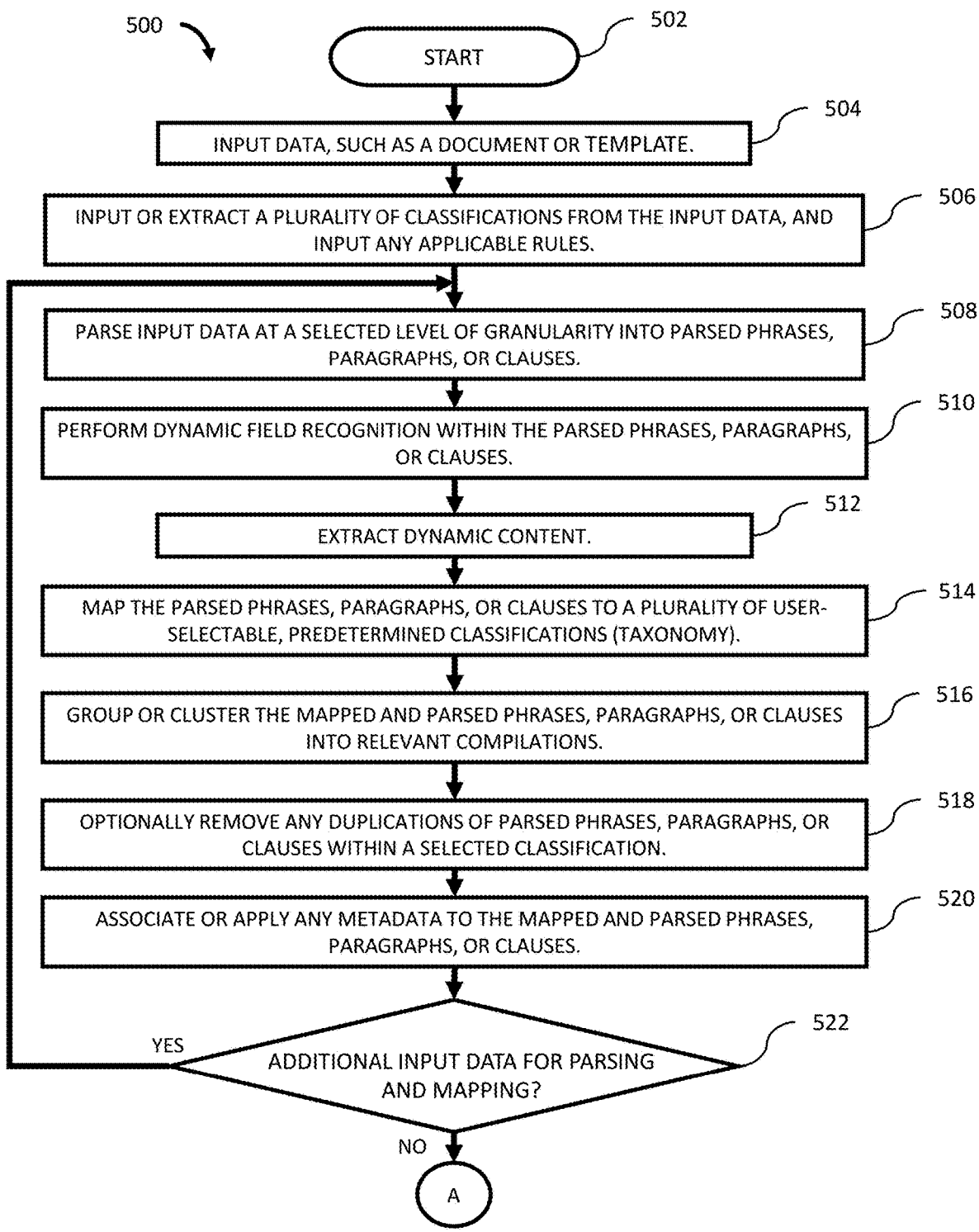

FIG. 1 is a block diagram illustrating an exemplary or representative database generation and search system 100 for database creation and personalization and customization of search results and search result ranking in a search engine. FIG. 2 is a block diagram illustrating an exemplary or representative (Internet-based or "cloud" based) server system (equivalently referred to as a computer server) or apparatus 200 for database generation, typically utilized in the larger search system 100. FIG. 3 is a block diagram illustrating an exemplary or representative (Internet-based or "cloud" based) server system (equivalently referred to as a computer server) or apparatus 300 for personalization and customization of search results and search result ranking in a search engine, typically utilized in the search system 100. FIG. 4 is a block diagram illustrating an exemplary or representative client device 400, 400A. FIG. 5 is a flow diagram illustrating an exemplary or representative method 500 embodiment for generation of one or more databases and a plurality of compilations for Internet or network-based search. FIG. 6 is a flow diagram illustrating an exemplary or representative method 600 embodiment for personalization of search results and search result output in a search engine 325. FIG. 7 is a block diagram illustrating exemplary or representative message transmission sequences for personalization of search results and search result output in a search engine 325.

The system 100 is an example of a database creation and information retrieval system in which the systems, components and techniques described below can be implemented. Although several components are illustrated, there may be fewer or more components in the system 100. Moreover, the components can be distributed on one or more computing devices connected by one or more networks or other suitable communication mediums. For example and without limitation, various system components may be provided by cloud-based service providers for running various portions of the methods 500, 600.

Referring to FIGS. 1-4, as illustrated, the exemplary database generation and search system 100 comprises at least one computer server system or apparatus 200, 300 coupled through a network 110 (such as the Internet) (along with other network equipment and various components such as a router 115, a wireless router 120, a switching center 125 and/or base station 130) to a plurality of client devices 400, 400A. A user can interact with the database generation and search system 100 through one or more client devices 400, 400A. Representative client devices 400, 400A include, for example and without limitation, a computer, a supercomputer, a personal computer, an engineering workstation, a mainframe computer, a tablet computing device, a mobile telephone or smartphone, or any other type of data processing device. For example, the client device 400, 400A can be a computer terminal within a local area network (LAN) or wide area network (WAN).

Continuing to refer to FIG. 1, as illustrated, the exemplary network 110 may be of any type of kind, using any medium such as wired, optical, or wireless, using any current or future protocols, such as, for example and without limitation, Internet Protocol ("IP"), Transmission Control Protocol ("TCP") (collectively with IP referred to as "TCP/IP"), which may further incorporate other current or future protocols, such as hypertext transfer protocol ("HTTP"), various email and file transfer protocols (e.g., SMTP, FTP), or other types of networks, such as the public switched telephone network ("PSTN"), cellular, LTE, GSM, EDGE, GPRS, Institute of Electrical and Electronic Engineers ("IEEE") 802.11, CDMA, WCDMA, 3G, 4G, or 5G, or any other network which provides for communication for data, voice or multimedia, for user input, selection, evaluation, reporting, media provision, and so on. The network 110, in turn, may be utilized to provide any type of communication between and among the at least one computer server system or apparatus 200, 300, the client devices 400, 400A, and any of the other illustrated devices, and may be directly or indirectly coupled to any of a plurality of such devices for such Internet, voice, multimedia or any other form of data communication, whether switched or routed, including without limitation router(s) 115, wireless router(s) 120, and server(s) 200, 300 of any type or kind (and which may be further coupled to one or more database(s) 220, 260, such as stored in a data storage device 250), switching center(s) 125 (including mobile switching centers), and wireless base station(s) 130, such as for communication to a mobile or cellular client device 400, 400A. For example, the network 110 may be the Internet, or a public or private LAN or WAN.

Referring to FIG. 2, the exemplary or representative server system (or apparatus) 200 for database generation comprises one or more processor(s) 210, a network input/output ("I/O") interface 215, and a memory 205 (such as a random access memory (RAM) or the other forms of memory 205 described below, such as DRAM, SRAM, SDRAM, etc., which also may include one or more databases 220A, 260A, such as one or more portions of databases 220, 260), and may be coupled to one or more additional data storage devices 250 for database 220, 260 storage. Depending upon the selected embodiment, the server system or apparatus 200 may also include optional components discussed below with reference to client devices 400, 400A, such as user input devices, for example. The processor(s) 210, network input/output ("I/O") interface 215, memory 205, and data storage device 250 having a database 220, 260, may be implemented or embodied as known or becomes known in the electronic arts, with various examples described in greater detail below. In addition, multiple server systems (or apparatuses) 200 may be utilized in a database generation and search system 100, for example and without limitation.

Referring to FIG. 3, the exemplary or representative server system (or apparatus) 300, for personalization and customization of search results and search result ranking in a search engine, comprises one or more processor(s) 310, and also includes a network I/O interface 315, and a memory 305 (such as a random access memory (RAM) or the other forms of memory 305 described below, such as DRAM, SDRAM, etc., which also may include one or more databases 220A, 260A, such as one or more portions of databases 220, 260), and may be coupled to one or more additional data storage devices 250 for database 220, 260 storage. Depending upon the selected embodiment, the server system or apparatus 300 may also include optional components discussed below with reference to client devices 400, 400A, such as user input devices, for example. The processor(s) 310, network input/output ("I/O") interface 315, memory 305, and data storage device 250 having a database 220, 260, may be implemented or embodied as known or becomes known in the electronic arts, with various examples described in greater detail below. In addition, multiple server systems (or apparatuses) 300 may be utilized in a search system 100, for example and without limitation.

It should be noted that while systems 200, 300 are illustrated separately, these systems may be combined into a single system and may otherwise share or include similar components, such as processors 210, 310 (each having one or more processor cores 212, 312), network I/O interfaces 215, 315, memories 205, 305, etc. The processors 210, 310 may be implemented using identical hardware, discussed in greater detail below, but are illustrated separately as each of the processors 210, 310 are configured or programmed differently, having different types of generators (e.g., configurations or programs) for database generation or for a search engine, respectively. It should also be noted that the various systems 100, 200, 300, may be distributed, with different components and/or functionalities provided in multiple computing and/or server systems in different locations, for example, such as in multiple and/or different cloud-based server farms or systems.

A user, such as a system administrator, using a client device 400, 400A, for example, can connect to the database generator 225 within a server system 200 to input and review data for database generation, as discussed in greater detail below with reference to FIG. 5, such as to input templates, classifications, documents, etc., which are utilized in the creation of a database 220, 260, 220A, 260A. The server system 200 can be one or more server devices in one or more locations, and can be provided through multiple and/or different service providers, for example and without limitation. A server device 200 includes a processor 210, which can include the database generator 225 loaded therein. A processor 210 is structured or otherwise programmed to process instructions or configurations within the server system (or apparatus) 200. These instructions can implement one or more components of the database generator 225. The processor 210 can be a single-threaded processor or a multi-threaded processor, and can include multiple processing cores 212. The processor 210 can process instructions stored in the memory 205 related to the database generator 225 and can send information to the client devices 400, 400A, through the network 110, to create a graphical presentation in a user interface of the client device 400, 400A (e.g., aspects of database creation and management, provided as a web page displayed in a web browser, such as using HTML, XML, Javascript, etc., alone or in combination with each other, for example and without limitation).

Referring again to FIG. 2, the database generator 225 of the processor(s) 210 of the server system (or apparatus) 200 receives (via network I/O interface 215) the data input and transmitted from a client device 400, 400A via the network 110, such as documents, templates, web pages, and other input data, including data of any kind or type and in any form or format. The database generator 225 utilizes the input information (as described in greater detail below) to generate and provide databases 220, 220A, 260, 260A. The database generator 225 may comprise one or more of the following subsystems or components, such as a parser and extractor 230, a vector (normalized) generator 235, a mapping generator 240, a lexical database generator 245, and a semantic (vector) database generator 255, which are adapted, configured or programmed to perform the database generation methodologies described in greater detail below. The database generator 225, and any or all of its subsystems or components, may also be distributed between and among the processing cores 212 in a representative embodiment. In representative embodiments, the database generator 225, and its various components, may also comprise or have one or more neural network configurations, which is or are trained on input training data, typically provided by a system administrator, a service provider, or an open source provider.

In a representative embodiment, the training data may be augmented, such as by using placeholders for semantic variables that change across different topics, such as legal contracts. Data extraction may also apply various rules-based models that exploit a lack of semantic and syntactic differences across various datasets.

Referring to FIGS. 3 and 4, a user, such as a searcher, can connect to the search engine 325 within a server system 300 to submit a query and receive search results, as discussed in greater detail below with reference to FIG. 6 and FIGS. 8A-11. When the user submits the query through a user input device 445 attached to or forming part of a client device 400, 400A (such as a keyboard, a touch screen, a mouse, etc.), a client-side query signal 705 (illustrated in FIG. 7) is sent into a network 110 and is forwarded to the server system 300 as a server-side query signal 710. Server system 300 can be one or more server devices in one or more locations. A server device 300 includes a processor 310, which can include the search engine 325 loaded therein. A processor 310 is structured or otherwise programmed to process instructions or configurations within the server system (or apparatus) 300. These instructions can implement one or more components of the search engine 325. The processor 310 can be a single-threaded processor or a multi-threaded processor, and can include multiple processing cores 312. The processor 310 can process instructions stored in the memory 305 related to the search engine 325 and can send information to the client devices 400, 400A, through the network 110, to create a graphical presentation in a user interface of the client device 400, 400A (e.g., a search results web page displayed in a web browser, such as using HTML, XML, Javascript, etc., alone or in combination with each other), such as those illustrated and discussed below with reference to FIGS. 8A-11.

For example, in system 100, a server system (or apparatus) 300 may be utilized to provide the personalization of search results and search result ranking in a search engine, interactively with a client device 400, 400A such as a computer or mobile smartphone, via network 110 (e.g., Internet). For such an embodiment, and as discussed in greater detail below with reference to FIGS. 8A-11, a series of graphical user interfaces 800, 810 are displayed on a client device 400, 400A, such as a computer or smartphone, with the user inputting information and making the various parameter selections described below via the series or succession of displayed graphical user interfaces 800, 810 in the client device 400, 400A, which information and parameter selections are then transmitted to the server system (or apparatus) 300. In turn, the personalization and customization of search results and search result ranking is performed by the server system (or apparatus) 300, using a search engine 325 (described below) and provides the personalization of search results 860, 870 and search result ranking (such as in the form of an HTML XML or scripting file) to the client device 400, 400A for display and selection via the one or more graphical user interfaces 820, 840, 855.

Also for example, representative embodiments of the subject matter described in this specification may be implemented in a computing system that includes a back-end or a middleware component, such as a server system or apparatus 200, 300, or that includes a front-end component such as client devices 400, 400A having an interactive graphical user interface or a web browser (either or both of which may display the graphical user interfaces 800, 810, 820, 840, 855), or any combination of one or more such back-end, middleware, or front-end components. The components of the system can be interconnected by any form or medium of digital data communication, such as the illustrated network or internet 110 as a representative communication network (e.g., a local area network ("LAN") and a wide area network ("WAN"), an inter-network such as the Internet, and/or a peer-to-peer network. The server system or apparatus 200, 300 and the client devices 400, 400A may utilize various different computing model infrastructures, such as web services, distributed computing and grid computing infrastructures, for example and without limitation.

FIG. 4 is a block diagram illustrating an exemplary or representative client device (or apparatus) 400, 400A. Referring to FIG. 4, the exemplary client device 400, 400A comprises one or more processor(s) 405, a network input/output ("I/O") interface 415, and a memory 410 (such as a random access memory (RAM) or the other forms of memory 410 described below, such as DRAM, SDRAM, etc., which also may include one or more databases). Depending upon the selected embodiment, the client device 400, 400A may also include optional components such as a user input/output ("I/O") interface 420 (such as for coupling to a user input device 445 such as a keyboard, computer mouse, or other user input device, not separately illustrated), an audio input/output interface 425 (e.g., for coupling to a microphone 355, to audio speakers or other audio player 430, such as for auditory output of results), a display interface or controller 435, and may also include a display 440, such as an LED or LCD screen or mobile smartphone touch screen, such as for display of the various graphical user interfaces 800, 810, 820, 840, 855. The processor(s) 405, network input/output ("I/O") interface 415, memory 410, user input/output ("I/O") interface 420, audio input/output interface 425, audio player 430, display interface or controller 435, and display 440, may be implemented or embodied as known or becomes known in the electronic arts, with various examples described in greater detail below. In addition, multiple client devices 400, 400A may be utilized in a system 100, for example and without limitation. The processor 405 is structured or otherwise programmed to process instructions within the system 100. In various embodiments, the processor 405 is a single-threaded processor or may be a multi-threaded processor, and may have a single processing core or multiple processing cores (not separately illustrated). The processor 405 is structured or otherwise programmed generally to process instructions stored in the memory 410 (or other memory and/or a storage device included with the client device 400, 400A) to display graphical information for a user interface.

Referring again to FIG. 3, the search engine 325 of the processor(s) 310 of the server system (or apparatus) 300 receives (via network I/O interface 315) the server-side query signal 710 transmitted from a client device 400, 400A via the network 110. The search engine 325 utilizes the information within the user query (as described in greater detail below) to generate and provide personalized and/or customized search results and search result ranking. The search engine 325 may comprise one or more of the following subsystems or components, such as a return query generator 330, a lexical (string) search comparator 335, a scoring and ranking (or sorting) generator 340, and an output generator 345, which are adapted, configured or programmed to perform the personalized and customized search, scoring, ranking, and data output methodologies described in greater detail below. The search engine 325, and any or all of its subsystems or components, may also be distributed between and among the processing cores 312 in a representative embodiment. In representative embodiments, the search engine 325, and its various components, may also comprise or have a neural network configuration (e.g., a 4-layer recurrent neural network (RNN), which is trained on input training data, typically provided by a system administrator.

The representative system, method, and apparatus embodiments provide or impose, for each subject, topic, field, or feature, various user-selectable or user-determined levels of organization and classification on the stored data in the various databases and the resulting search results. At a high level, data such as a document (e.g., a contract, an employee handbook, a Securities and Exchange Commission (SEC) filing, etc.) or any other source of data, including web pages from any and all other sources, is input and parsed (by parser and extractor 230) into parsed phrases, paragraphs, or clauses, for example. A collection of these parsed phrases, paragraphs, or clauses are categorized according to the subject, topic, field, or feature, such as the subject or type of document or topic, and are referred to herein as a "compilation", such as a first compilation of parsed phrases, paragraphs, or clauses relevant to a nondisclosure agreement; a second compilation of parsed phrases, paragraphs, or clauses relevant to an employee handbook; a third compilation of parsed phrases, paragraphs, or clauses relevant to an SEC filing; a fourth compilation of parsed phrases, paragraphs, or clauses relevant to a scientific topic such as raptor or other avian anatomy and physiology, a fifth compilation of parsed phrases, paragraphs, or clauses relevant to an engineering topic such as semiconductor design and fabrication, a sixth compilation of parsed phrases, paragraphs, or clauses relevant to property tax records, a seventh compilation of parsed phrases, paragraphs, or clauses relevant to real estate sales, and so on. In a representative embodiment, each such compilation may also be referred to as a "playbook", such as illustrated in the various GUIs discussed in greater detail below. In a representative embodiment, the parser and extractor 230 is implemented as a neural network, and is trained on a training data set, generally for any selected subject or topic.

Another user-selectable or user-determined level of organization available in various representative embodiments is a multi-level classification system referred to as a "taxonomy", which is a system of classification relevant to any selected compilation, and is relevant to the subject, topic, field, or feature for that compilation. At one level, in a representative embodiment, a user (such as a system administrator) can classify parsed phrases, paragraphs, or clauses into a multi-level taxonomy. Such a taxonomy can be stored in a representative system for later access by a user, with the user able to subsequently quickly locate a desired document clause by opening the appropriate classifications ("taxons") and sub-classifications ("subtaxons") within the taxonomy. In many ways the taxonomic classification system is similar to the Linnean classification system of living things, where for example a user searching for the appropriate classification for a zebra would logically search an area of the taxonomy containing other similarly shaped animals (such as horses), as opposed to searching the classifications containing fungi (such as mushrooms) or insects (such as honeybees). In a representative embodiment a user can import one or more documents or web pages (for example a business contract, a product specification, an operating manual) into the system 100, 200. The system 100, 200 will then parse the document into parsed phrases, paragraphs, or clauses and classify the parsed phrases, paragraphs, or clauses according to the relevant classification system (taxonomy). For example and without limitation, the classification of the parsed phrases, paragraphs, or clauses may be according to the typical names of contract sections (e.g., "representations and warranties" or "indemnification"), by relevant party (e.g., "data discloser" or "data receiver"), or the typical names of avian anatomy, physiology, or behavior (e.g., "retrices", "remiges", "mating behavior", "talons", "song"), or the typical names utilized in semiconductor fabrication (e.g., "silicon", "gallium arsenide", "diode", "LED", "field effect transistor", "MOSFET", "wafer"), or any other method deemed appropriate by a user. This process of assigning parsed phrases, paragraphs, or clauses to the user-selectable or user-determined classifications ("taxons", including creating new taxons when necessary) within a classification system or taxonomy is also referred to as "mapping", and may be performed (by the mapping generator 240) with any user-selectable or user-determined confidence level. Once a classification system or taxonomy is established in a representative embodiment, subsequent search queries and organization or reorganization of classifications (if desired) could be quickly executed by a user. In a representative embodiment, the mapping generator 240 is also implemented as a neural network and is trained on a training data set, generally for any selected subject or topic. Example classifications are illustrated and discussed below, such as classification 880 illustrated in FIG. 10.

Another user-selectable or user-determined level of organization available in various representative embodiments is an output data structure for search results referred to as a "template", which is a logical, organized "container" for search results, and serves to provide actionable information to the user. Such a template defines which set(s) of search results are returned, in what order, and how the search results are to be rendered, including metadata or sets of instructions pertaining to the presentation and formatting of the search results (e.g., order, names, font, styles, headers, footers, weighting, tagging of variants, etc.). For example and without limitation, the output search results may be organized and formatted in the form of a template for a nondisclosure agreement, or an employee handbook, or an engineering design memorandum, etc., complete with appropriate numbering, bulleting, formatting, section headings, cross-references, signature blocks, etc. Such templates may be provided by the user, such as a system administrator, or may be derived directly from an input document. Generally, for each compilation and template, there are multiple user-selectable or user-determined options available, so that different alternatives or versions may be selected by the user for inclusion in the final, output search results. Example templates are illustrated and discussed below, such as template 885 illustrated in FIG. 9 and template 865 illustrated in FIG. 10.

It should be noted that the parsed phrases, paragraphs, or clauses, and the mapped classifications of these parsed phrases, paragraphs, or clauses, may be relevant to multiple templates and compilations (playbooks). For example, within a template, multiple selections of parsed phrases, paragraphs, or clauses may be available, as multiple or different compilations or versions, such as an English version, a French version, versions for different language translations, a version for California, a version for Illinois, etc., including different versions or variants for each of the parsed phrases, paragraphs, or clauses. This is especially significant for updating, because once an update is applied to any selected, parsed phrases, paragraphs, or clauses, those updates are automatically included in all search results having the parsed phrases, paragraphs, or clauses, for all of the templates and compilations.

For example and without limitation, a representative template may have the form of a title (determined from the selected compilation), an ordered list of the relevant classifications (determined from the selected compilation, and often appearing as section headings), an ordered listing of the parsed phrases, paragraphs, or clauses correspondingly mapped to each of the classifications (determined from the selected compilation and user selection of the versions or variants of the parsed phrases, paragraphs, or clauses), with any applicable numbering, bulleting, indentations, font, style, underlining, etc., such as a generic template having "N" classifications:

Title

Classification 1:
   Phrase, paragraph, or clause mapped to Classification 1.
Classification 2:
   Phrase, paragraph, or clause mapped to Classification 2.
Classification 3:
   Phrase, paragraph, or clause mapped to Classification 3.
Classification 4:
   Phrase, paragraph, or clause mapped to Classification 4.
\*\*\*
Classification N:
   Phrase, paragraph, or clause mapped to Classification N.

The substantive classifications and phrases, paragraphs, or clauses are determined by the selected compilation and the user-selected variants of the phrases, paragraphs, or clauses, such as discussed in greater detail below with reference to FIG. 10.

FIG. 5 is a flow diagram illustrating an exemplary or representative method 500 embodiment for generation of one or more databases 220, 260 and a plurality of compilations for Internet or network-based search. Referring to FIG. 5, the method 500 begins, start step 502, with inputting data, such as a document or template, step 504. Classifications (e.g., taxonomies) are then input or extracted from the input data, and any applicable rules may also be input, step 506. Using the parser and extractor 230 of the database generator 225, input data is parsed at a selected level of granularity into parsed phrases, paragraphs, or clauses, step 508; dynamic field recognition within the parsed phrases, paragraphs, or clauses is performed, step 510; and dynamic content is extracted, step 512. For example and without limitation, input data such as text may be parsed or split based on logical paragraph groups (e.g., double newline characters such as \r\n, \n), or based on individual sentences or phrases (e.g., based on periods or commas), or based on XML tags or format characters (e.g., <w:p></w:p> for paragraphs). In addition, depending upon the selected embodiment, formatting of input text may be retained (e.g., background highlighting, bold, underline, italic, strikethrough, etc.). Other extraction tools may be commercially available, such as Amazon Comprehend (available from Amazon.com, Inc.). Within these parsed phrases, paragraphs, or clauses, dynamic field recognition and extraction is utilized to recognize various fields which are fluid or readily changeable within a document or subject, such as names of parties, addresses, start dates, end dates, etc., so that they are flagged for subsequent use by the user, e.g., to be filled in with relevant information, as needed, such as dynamic fields 845 illustrated in FIGS. 10 and 11. In a representative embodiment, the parser and extractor 230 is implemented as a neural network, such as an LSTM (long short-term memory) neural network having forward and backward layers) and is trained on a training data set, generally for any selected subject or topic. The training data set is typically provided as a plurality of split pairs of sentences. For example, a first sentence and a next sentence may be provided, and if there is a low similarity between them, parsing may occur between the first and second sentences. It should also be noted that accuracy is improved when the parsed phrases, paragraphs, or clauses have similar lengths.

Using the mapping generator 230 of the database generator 225, the parsed phrases, paragraphs, or clauses are then mapped to the user-selectable, predetermined classifications (taxonomy), step 514. For example, parsed phrases, paragraphs, or clauses may be compared character-by-character (e.g., in UTF-8) and automatically mapped based on the degree of match with the relevant classification. For example and without limitation, an open source BERT-base uncased model can be used for classification or mapping (see, e.g., https://huggingface.co/bert-base-uncased). The mapped and parsed phrases, paragraphs, or clauses are then grouped or clustered into the relevant compilations, step 516, and as an option, any duplications of parsed phrases, paragraphs, or clauses within a selected classification may be removed, step 518, or alternatively removed in step 544, as discussed below. Any applicable metadata (including a confidence level and/or template and compilation designations) is or are then associated with or applied to the mapped and parsed phrases, paragraphs, or clauses, step 520. Types of metadata, for example and without limitation, may include one or more identifiers or references to a parent or originating document or other source, template, compilation, variants, placeholders, cross-references, inline references to definitions or other phrases, paragraphs, or clauses, etc. When there is additional input data for parsing and mapping, step 522, the method returns to step 508 and iterates.

As a representative example and without limitation, a mapped and parsed phrase, paragraph, or clause may be stored in the compilation and database 220 as:

```
type CatalogEntry = {
    catalogId: string;
    accountId: string;
    name: string;
    displayName: DisplayName;
    type: CatalogEntryType;
    numbering?: CatalogEntryNumberingType | null;
    numberingLastFormat?: string | null;
    numberingIgnoreFormat?: boolean | null;
    parentEntryId: string;
    variants: CatalogEntryVariant[ ];
    inactiveVariants: CatalogEntryVariant[ ];
    taxonomyCatalogEntry?: { // What is this?
        _id: string;
        name: string;
    };
    legalOwners?: AccountUserOrTeamId[ ];
    businessOwners?: AccountUserOrTeamId[ ];
    guidance?: string;
    properties: {
        [x: string]: PropertyValue;
    };
    children: string[ ];
    historicalVariants?: GroupedVariantHistory[ ];
};
```

In a representative embodiment, as mentioned above, it should be noted that the parser and extractor 230 and/or mapping generator 230 of the database generator 225 may be implemented as one or more AI neural networks, using artificial intelligence to train the parser and extractor 230 and mapping generator 230 on one or more sets of parsing and mapping training data, which has input data and resulting data which has been correctly parsed, extracted, and mapped, for example and without limitation.

When there is no further input data available for parsing and mapping, the lexical database generator 245 of the database generator 225 creates a first, lexical database 220 of the mapped and parsed phrases, paragraphs, or clauses with associated metadata, including template and compilation designations, step 524.

The semantic (vector) database generator 255 of the database generator 225 then mathematically transforms or converts the parsed phrases, paragraphs, or clauses into multi-dimensional vector representations, step 526, using pre-trained models. For example and without limitation, using the AI sentence transformer based embedding system and using the pre-trained all-MiniLM-L6-v2 model or multi-qa-MiniLM-L6-cos-v1 sentence transformers model available from Hugging Face (https://huggingface.co/sentence-transformers/all-MiniLM-L6-v2) (or, for example, using the pretrained nreimers/MiniLM-L6-H384-uncased model, or https://www.sbert.net/docs/pretrained_models.html), each parsed phrase, paragraph, or clause, as a text string, is converted into a multi-dimensional vector, such as a 384-dimensional dense vector, which captures the semantic information of the parsed phrases, paragraphs, or clauses and can be used for generation of the various compilations, as discussed in greater detail below. Additional training data sets are available, including for example and without limitation, S2ORC, WikiAnswers, GOOAQ, Yahoo Answers, Stack Exchange, and so on. While referred to as vectors or equivalently vector representations, it should be noted that any such vector may be referred to equivalently as a matrix or a tensor, and any and all such variations are considered equivalent and within the scope of the disclosure.

The multi-dimensional vectors are then normalized using the semantic (vector) database generator 255, step 528, such as by using an L2 norm, where the L2 norm is defined as (Equation 1): $|x|_2 = \sqrt{\sum_{i=1}^{n} |x|^2}$. The normalized, multi-dimensional vectors are then grouped into a plurality of clusters based upon similarity between each of the normalized, multi-dimensional vectors, such as based upon the cosine similarity or cosine distance (inner dot product) of each normalized, multi-dimensional vector with each of the other normalized, multi-dimensional vectors, step 530. Cosine similarity, for example, may be determined as (Equation 2): $u \cdot v = |u||v|\cos\theta = \sum_{i=1}^{n} a_n b_n$. Any and all other ways of determining similarity between and/or among vectors are considered equivalent and within the scope of the disclosure.

Any duplications among the clustered, normalized, multi-dimensional vectors are removed, step 532, or alternatively removed in step 544. The semantic (vector) database generator 255 then creates and indexes a second, semantic database 260 from the normalized, multi-dimensional vectors, step 534. For example and without limitation, Facebook AI's Faiss library (https://engineering.fb.com/2017/03/29/data-infrastructure/faiss-a-library-for-efficient-similarity-search/, available from Meta Platforms, Inc., of Menlo Park, California, US) may be utilized to create and periodically update the second, semantic database 260 having the normalized, multi-dimensional vectors, using an index type that stores the normalized, multi-dimensional vectors in semantically searchable clusters, using either of the available CPU or GPU implementations, which may be selected for lower power consumption or higher speed, respectively. The second, semantic database 260 (and/or indices of the second, semantic database 260, equivalently) may also be stored in an Amazon Simple Storage Service (S3) bucket (https://aws.amazon.com/s3/, available from Amazon.com, Inc. of Seattle, Washington, US), also for example and without limitation. Alongside any index generated, the method 500 may also store the text, clauseId, and variantId of the compilation at the point the index is generated, in the second, semantic database 260.

The second, semantic database 260 is then searched, for each selected parsed phrase, paragraph, or clause, for each compilation, step 536, using the corresponding normalized vector for each parsed phrase, paragraph, or clause, and its similarity with each of the other normalized, multi-dimensional vectors is determined, such as by using cosine similarity (as an inner dot product between each vector). When a normalized vector has a similarity greater than a predetermined threshold, step 538, the parsed phrase, paragraph, or clause corresponding to the vector is then included as an available version, variant or variation for the selected parsed phrase, paragraph, or clause and is incorporated into the first, lexical database 220, such as incorporated into the corresponding compilations of the first, lexical database 220, step 540. When there are additional parsed phrases, paragraphs, or clauses remaining to be searched (using their corresponding vectors), step 542, the method iterates, returning to step 536. When all of the vectors of the parsed phrases, paragraphs, or clauses have been searched for similarity in the second database 260 and all incorporations into the first, lexical database 220 of the parsed phrases, paragraphs, or clauses from the similar vectors within the second, semantic database 260 have been performed, any duplications of parsed phrases, paragraphs, or clauses within a selected classification may be removed from the first, lexical database 220, step 544, and the method 500 may end, return step 546.

As an example, a stored result in the first, lexical database 220 may include an identifier for the parsed phrase, paragraph, or clause (as a "clauseId" reference to the text in the database 220); a cosine score calculated for each vector (also having an identifier), and used in determining cosine similarity in searching (and resulting confidence level); a variant identifier (as a "varientId"), identifying each variant of a parsed phrase, paragraph, or clause; and the text of the variant, all for example and without limitation. Continuing with the example, a stored result may appear as:

```
{
    "clauseId": "pvX0Lgj68ZXqaMgo",
    "cosine_score": 83.13167691230774,
    "text": "This {{agreement}} constitutes the entire understanding
of the parties hereto with respect to the subject matter hereof
and replaces and supersedes any and all prior agreements,
understandings and representations,
whether written or oral, relating in any way to the subject matter hereof.",
    "varientId": "pFMEfaY5b33Cr7JJv"
}.
```

Figure 8A:
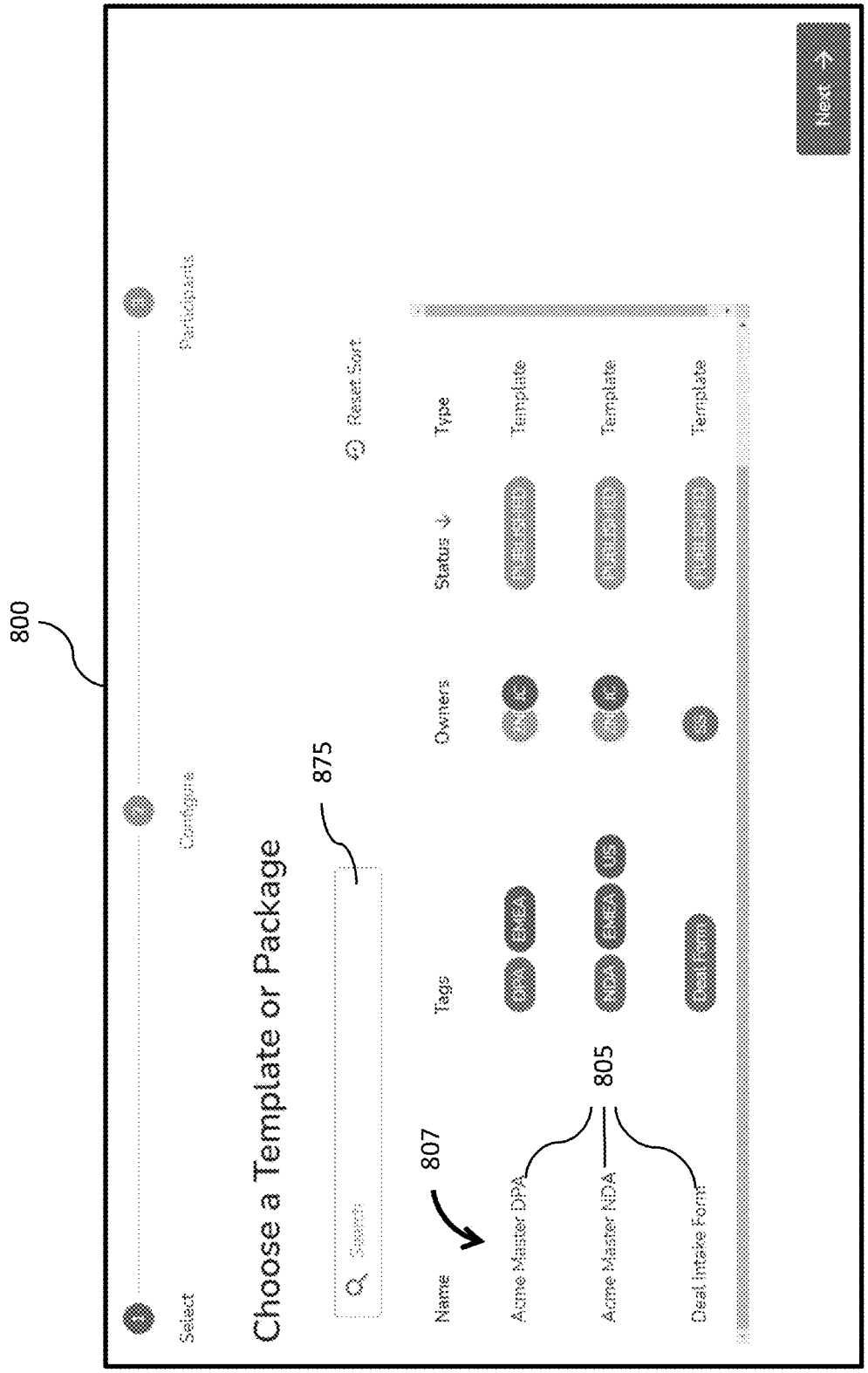
FIGS. 8A and 8B (collectively referred to as FIG. 8) are sequences of diagrams illustrating exemplary or representative first and second graphical user interfaces ("GUIs") providing user-selectable search parameters.
Figure 8B:
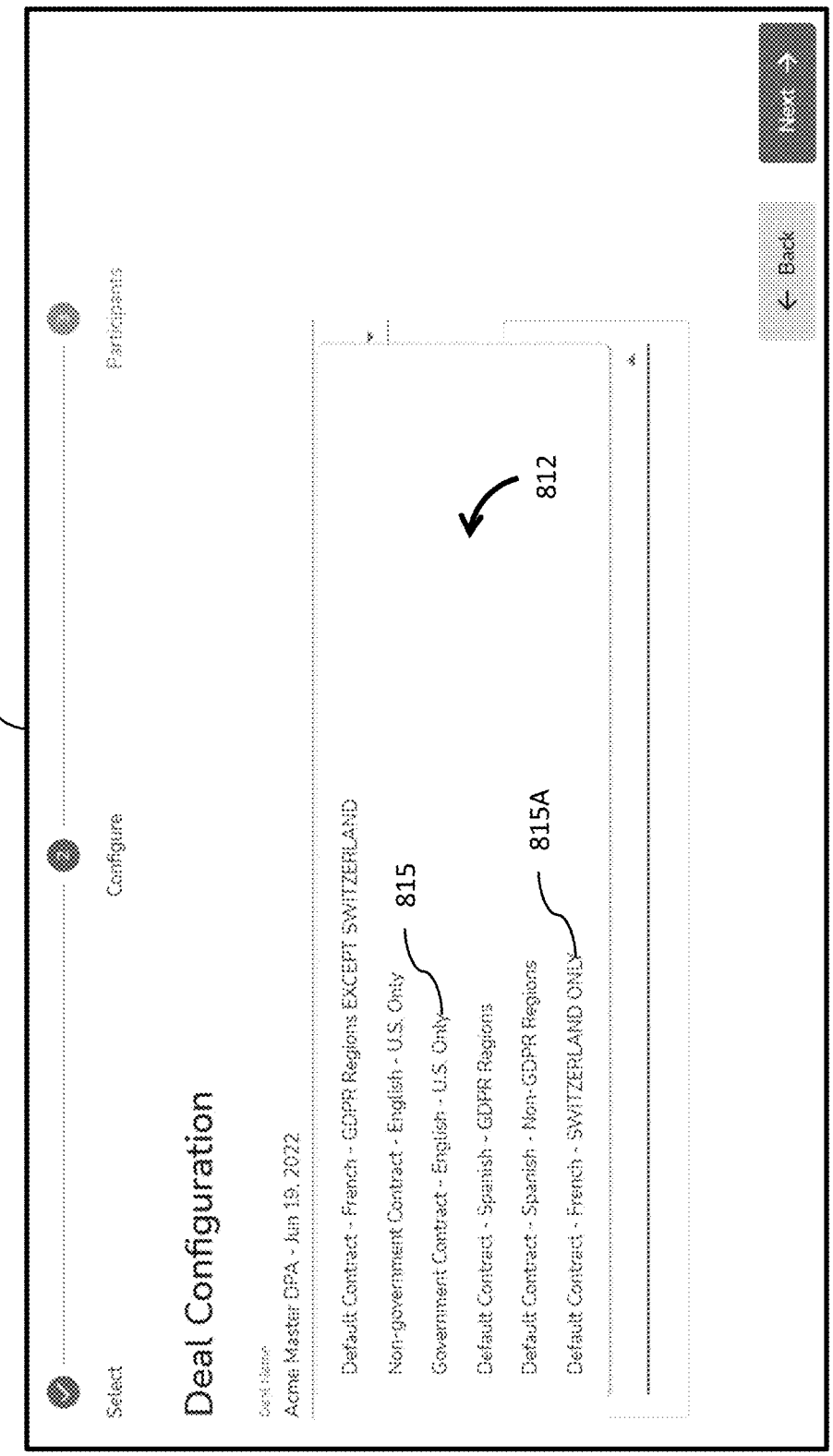
Figure 9:
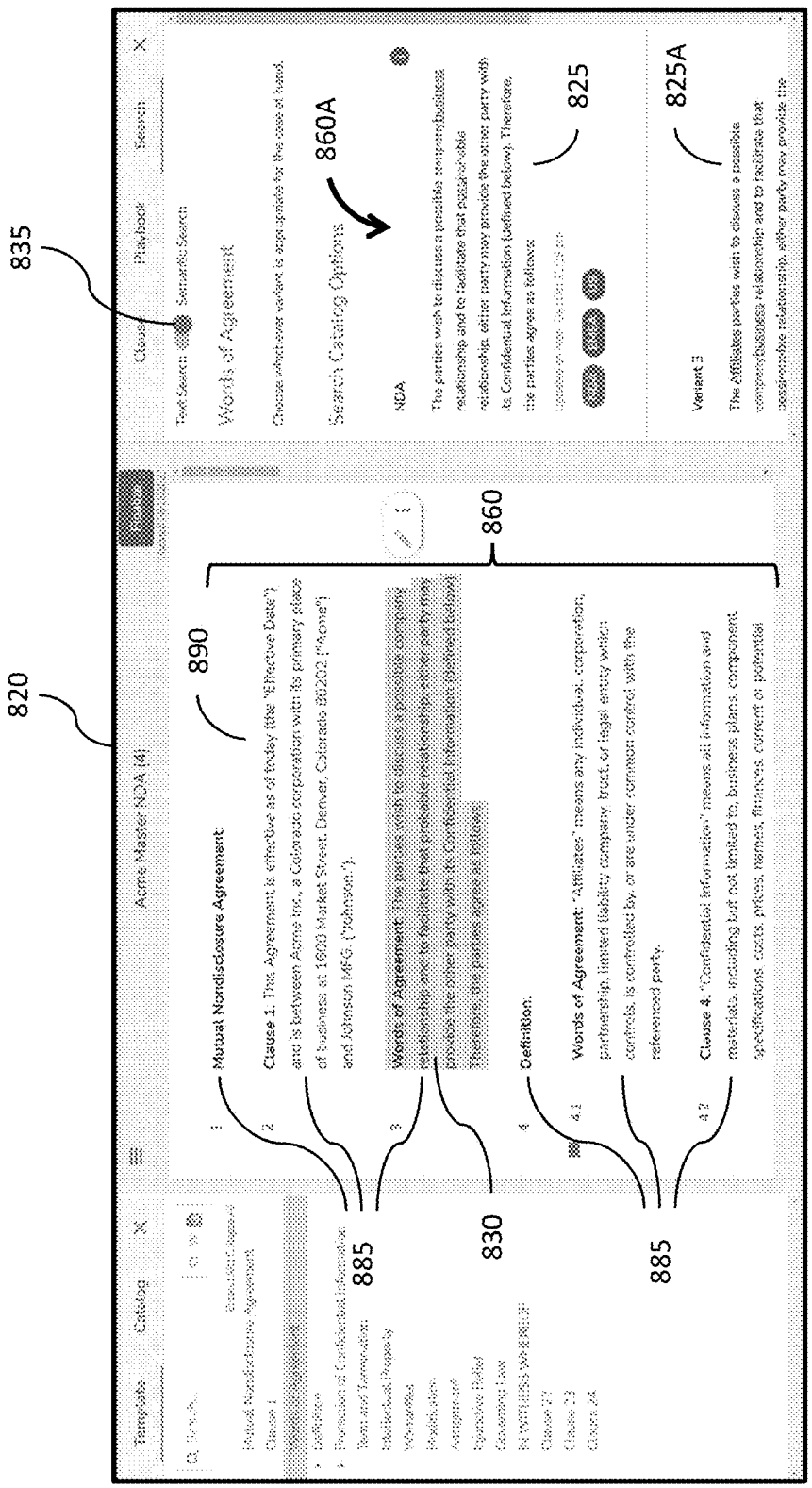
FIG. 9 is a diagram illustrating an exemplary or representative third GUI providing a plurality of variants as search results, from both a first, lexical database and a second, semantic database.

FIGS. 8A and 8B are sequences of diagrams illustrating exemplary or representative first and second graphical user interfaces ("GUIs") 800, 810 providing user-selectable search parameters 805, 815. FIG. 9 is a diagram illustrating an exemplary or representative third GUI 820 providing a plurality of variants 825, 825A as search results, from both the first, lexical database 220 and the second, semantic database 260. FIG. 10 is a diagram illustrating an exemplary or representative fourth GUI 840 providing a plurality of search results 860 organized within a selected template 865. FIG. 11 is a diagram illustrating an exemplary or representative fifth GUI 855 providing a plurality of search results 860 organized within a selected template 865 and downloadable as a separate document 850.

Referring to FIGS. 5 and 9, those having skill in the art will recognize that in creation of the first, lexical database 220, in a representative embodiment, a semantic, vector search has already been performed across or within a second, separate, semantic database 260, in advance of any user search. As a result, any user search within the first, lexical database 220 will automatically include corresponding results from a semantic, vector search of the second, semantic database 260. This pre-searching and incorporation of similar parsed phrases, paragraphs, or clauses from the second, semantic database 260 and into the compilations of the first, lexical database 220 is illustrated in FIG. 9, which illustrates a GUI 820 having a plurality of variants 825, 825A automatically provided as part of ranked search results 860, and illustrated side-by-side for direct comparison, for a phrase, paragraph, or clause 830 selected by the user for searching (shown as highlighted). Ranking is accomplished by providing the highest matching search results as the primary search results 860 within the template 885 and the plurality of variants 825, 825A as search results 860A provided as search (catalog or compilation) options as shown in the GUI 820. As illustrated, the phrase, paragraph, or clause 830 has been selected by the user simply moving a cursor over and clicking on the phrase, paragraph, or clause 830, for example and without limitation, with the GUI 820 showing the selection by highlighting the phrase, paragraph, or clause 830, and with the system 100, 300 automatically searching and providing the plurality of variants 825, 825A in response to the user selection within the GUI 820. As illustrated, the plurality of variants 825, 825A have been pre-searched and selected within (steps 536, 538) and provided from the second, semantic database 260, and with the plurality of variants 825, 825A visible and selectable in the GUI 820 by the user toggling a GUI button 835, which selects search results, as variants, available in text search of the first, lexical database 220 and in the semantic, vector search of the second, semantic database 260.

Referring to FIGS. 6-11, an exemplary or representative method 600 embodiment for personalization of search results and search result output in a search engine, and utilizes the first, lexical database 220, which in a representative embodiment also has similarity results incorporated from the second, semantic database 260. The method begins, start step 602, with a reception of one or more queries 705, 710 by the search engine 325, or the presentation by the server system 300 of a plurality of selectable queries 705, 710 to the user, such as via the graphical user interface illustrated in FIGS. 8A and 8B, and then reception of one or more queries 705, 710 by the search engine 325. Stated another way, a user, using a client device 400, 400A and typically following a log in or user registration process, generates one or more client-side queries 705 (illustrated in FIG. 7) transmitted via the network 110 and received by the server system 300 as one or more server-side queries 710, or referred to herein more simply as a query or queries 705, 710. In a representative embodiment, the one or more client-side queries 705 may be input into a search box 875 provided in a GUI 800 (illustrated in FIG. 8A), for example and without limitation. In another representative embodiment, the user may input the query or queries 705, 710, and the search engine 325 (and more particularly the return query generator 330) will utilize the query 705, 710 (e.g., through keywords such as "nondisclosure", "indemnification", "sales", "services", and so on, also for example and without limitation), as discussed in greater detail below. These one or more client-side queries 705 are then transmitted (via network 110) to the search engine 325.

Instead of immediately returning search results in response to the query 705, 710, as an option, the return query generator 330 of the search engine 325 of the server system 300 retrieves (from memory 205 and/or from database 220 stored in data storage device 250), step 604, and transmits (returns) a first (or next) "return query" (or "reverse queries") 715 (for one or more of the server-side return queries 715, transmitted via network 110 to form one or more client-side return queries 720, and referred to herein more simply as a return query (or queries) 715, 720) to this user, step 606. These return queries 715, 720 have at least one of several forms, and all are one or more series of questions or selections pertaining to parameters or characteristics directly relevant to the client-side query 705, such as questions or selections directly relevant to input parameters such as template 805 selection (provided in GUI 800 and illustrated in FIG. 8A), compilation (or catalog) 815, 815A selection (provided in GUI 810 and illustrated in FIG. 8B), language selection, region or state selection, file selection, name for the search results, parties, start and end dates, for example and without limitation. For example, as illustrated in FIG. 8A, a user may select a template 805 from the listing 807, and as illustrated in FIG. 8B, a user may select a compilation (catalog) 815, 815A provided in a drop-down menu 812. As such, the return queries 715, 720 may also be considered, equivalently, to be "parameter requests", for the search engine 325 to obtain various parameters (determined by the user) which are used to provide customized search results. In a representative embodiment, the return queries 715, 720 are stored and indexed in the memory 205 and/or from database 220 stored in data storage device 250, and as a result, the return query generator 330 may utilize the query 705, 710 or keywords of the query 705, 710 to access the memory 205 and/or database 220 (or 260) and retrieve the return queries 715, 720 corresponding to the indexed query 705, 710 and/or its keywords. Such an index system in the memory 205 and/or database 220, 260 may have any number of forms and structures, as known or becomes known in the art, such as a series of database tables, look-up tables, etc. In various representative embodiments, the various queries 705, 710 and/or return queries 715, 720 may be provided in drop down or other selection menus, for example and without limitation. The responses to the return queries 725, 730 (equivalently referred to as responses to parameter requests 725, 730), received by the server system 300, may be considered to be customizable or user-selectable parameters, such as for template and compilation selection, as illustrated in FIGS. 8A and 8B.

Those having skill in the art will recognize that any and all such return queries 715, 720 are likely to vary over time and be indexed in the memory 205 and/or database 220, 260 for entirely new keywords, topics, etc., as entirely new fields and opportunities are developed and implemented, and correspondingly return queries 715, 720 may be developed and deployed for any selected search topic for personalization of search results and personalization of search result ranking. Innumerable examples of recently developed new fields are available, and might include cloud-based services and technology, smartphone application development, online music download development, social media web development, and so on.

As mentioned above, in another representative embodiment, instead of selecting one or more queries 705, 710 (such as from a drop down menu) the user may input their own, personal query or queries 705, 710 (e.g., in search box 875), and the search engine 325 (and more particularly the return query generator 330) will utilize the query 705, 710, as mentioned above, to access the memory 205 and/or from database 220 (or possibly 260) and retrieve the return queries 715, 720 corresponding to the indexed query 705, 710 and/or its keywords.

As the user provides responses to the return queries 725, 730 which are received by the search engine 325, step 608, depending upon the particular search and number of relevant return queries 715, 720, when additional return queries 715, 720 are available, step 610, the method iterates, returning to step 606 and transmitting the additional return queries 715, 720 and receiving the additional responses 725, 730, steps 606 and 608. (In the event responses are not received in step 608, depending on the selected embodiment, the search engine 325 may proceed to step 612 if responses have been received previously).

Referring again to FIG. 6, following steps 606-610, with the responses to the return queries 715, 720 and any input query 705, 710 having been received, in step 612, the search engine 325 proceeds to search the memory 205 and/or database 220 (or 260), such as using the lexical (text or string) search comparator 335 to perform a lexical (text or string) search having a predetermined or user-selectable confidence level (i.e., a predetermined or user-selectable degree of matching), to provide one or more sets of (first) initial search results for the selected compilation and the selected template. For example and without limitation, a text search may be performed with an elastic (or "fuzzy") algorithm, including removing words such as "and", "the", "or", "is", and tokenizing and stemming the remaining words (e.g., removing "ing" or "ed").

As an option in step 612, the method 600 may also transform the query and/or a selected phrase, paragraph, or clause (such as provided in the query or the first initial search results), into a multi-dimensional vector for searching, as described above, and using this search vector, perform a similarity search (e.g., cosine similarity) in the second, semantic database 260, to provide one or more sets of second initial search results for the selected compilation and the selected template, which may be output with the first initial search results. For example and without limitation, the index corresponding to the compilation may be fetched, downloaded and queried from the S3 bucket, and the top "k" results based on the query may be fetched. A json file may be provided with the text, clauseIds and variantIds, returned by the Faiss library based on the nearest neighbor to the query vector.

As mentioned above, in a representative embodiment, the selected compilation 815, 815A and the selected template 805, 865 serve to provide a constrained context for searching, limiting the potential search results to those already determined to fit within these constraints within the confidence level, improving the speed, accuracy, and relevance of the search.

In representative embodiments, the scoring and ranking (or sorting) generator 340 then compares (comparatively scores) each selected phrase, paragraph, or clause of the initial search results, for each classification 880 (e.g., illustrated in FIG. 10, which also provides the classifications 880 as a plurality of section headings which further demarcate corresponding template locations 890) of the selected template 865 and selected compilation 815, 815A, with all of the other variants of the selected phrase, paragraph, or clause, step 614. The output generator 345 then outputs, such as via the GUI 820, the initial search results, step 616, with the highest matching search results ranked as the primary search results 860 within the template 885 and the remaining matching search results provided as the plurality of variants (or versions) 825, 825A as (potentially equally or lower ranked) search results 860A, as search (catalog or compilation) options as shown in the GUI 820. Regardless of how scored and ranked, significantly, the representative embodiments of the search engine 325 output the search results, at the selected level of granularity, organized into the selected template format for the selected compilation, with any (and/or all) available versions or variants of the search results provided for side-by-side comparison, for each selected phrase, paragraph, or clause, such as illustrated in the GUI 820 of FIG. 9. The user may then select each phrase, paragraph, or clause (or other selected level of granularity), from among the initial search results 860, 860A (i.e., select any version or variant of the phrase, paragraph, or clause), for inclusion in the final search results 870, illustrated in GUI 840 of FIG. 10, and these selections are then received by the search engine 325, step 618.

When all of the user selections have not yet been received, step 620, such as while the user receives and evaluates the initial search results, for example, such as by scrolling through the GUI 820, the user may continue to select various phrases, paragraphs, or clauses for each classification (or location) within the template 885 for the selected compilation, with the method iterating and returning to step 618 for ongoing user selection and receipt of the user's selections. When all user selections have been received in step 620, the output generator 345 of the search engine 325 generates and transmits, step 622, and stores in the memory 305 or database 220, 220A, step 624, the final, user-selected search results 870, at the selected level of granularity, organized within the selected template 865 for the selected compilation. As an option, the output generator 345 also provides a downloadable version of the final results, as a separate document, step 626, which the user may optionally select, such as using the button or link 850 in drop down menu 852 of the GUI 855 illustrated in FIG. 11. Following step 626, the method may end, return step 628.

Figure 10:
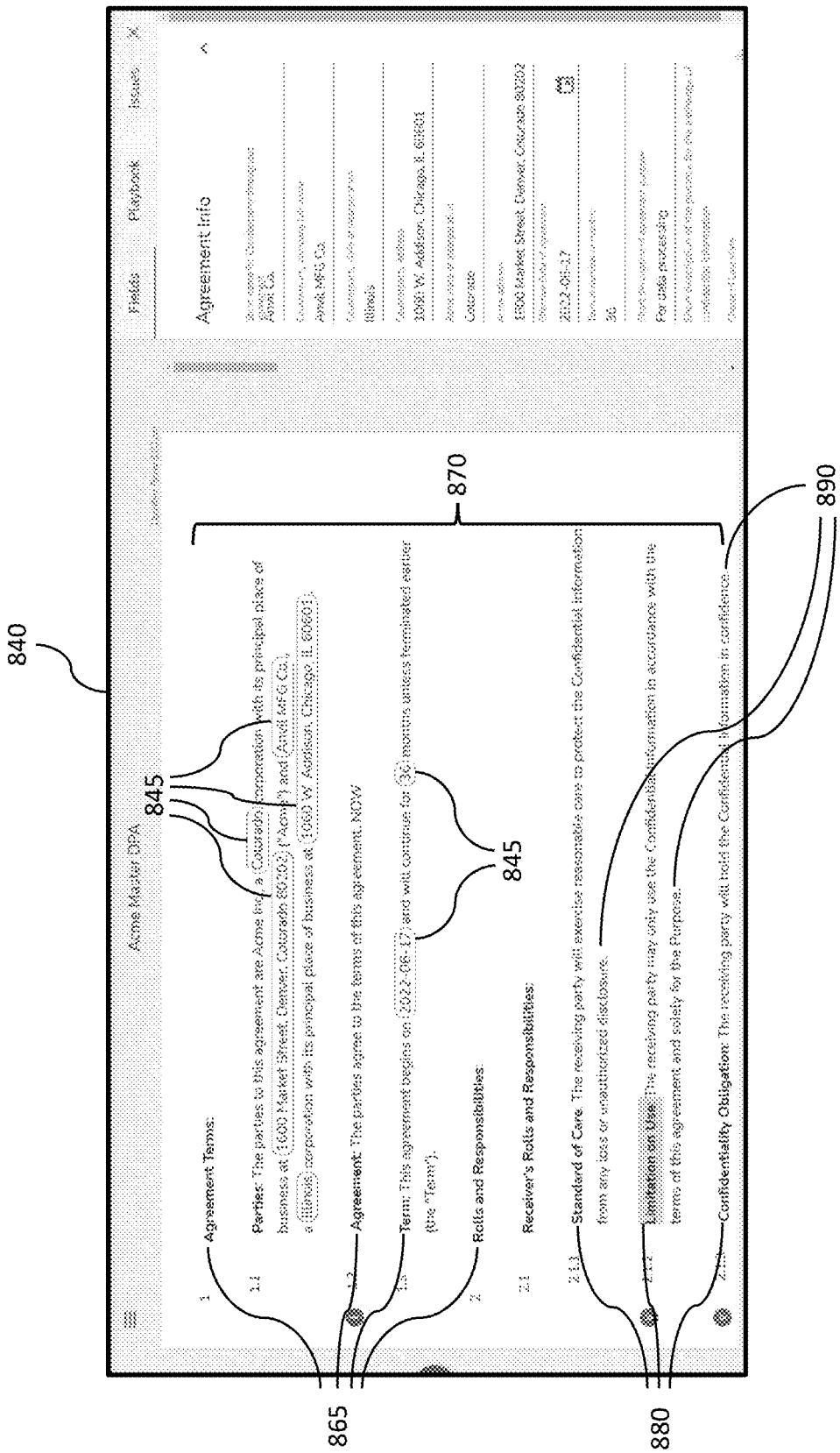
FIG. 10 is a diagram illustrating an exemplary or representative fourth GUI providing a plurality of search results organized within a selected template.
Figure 11:
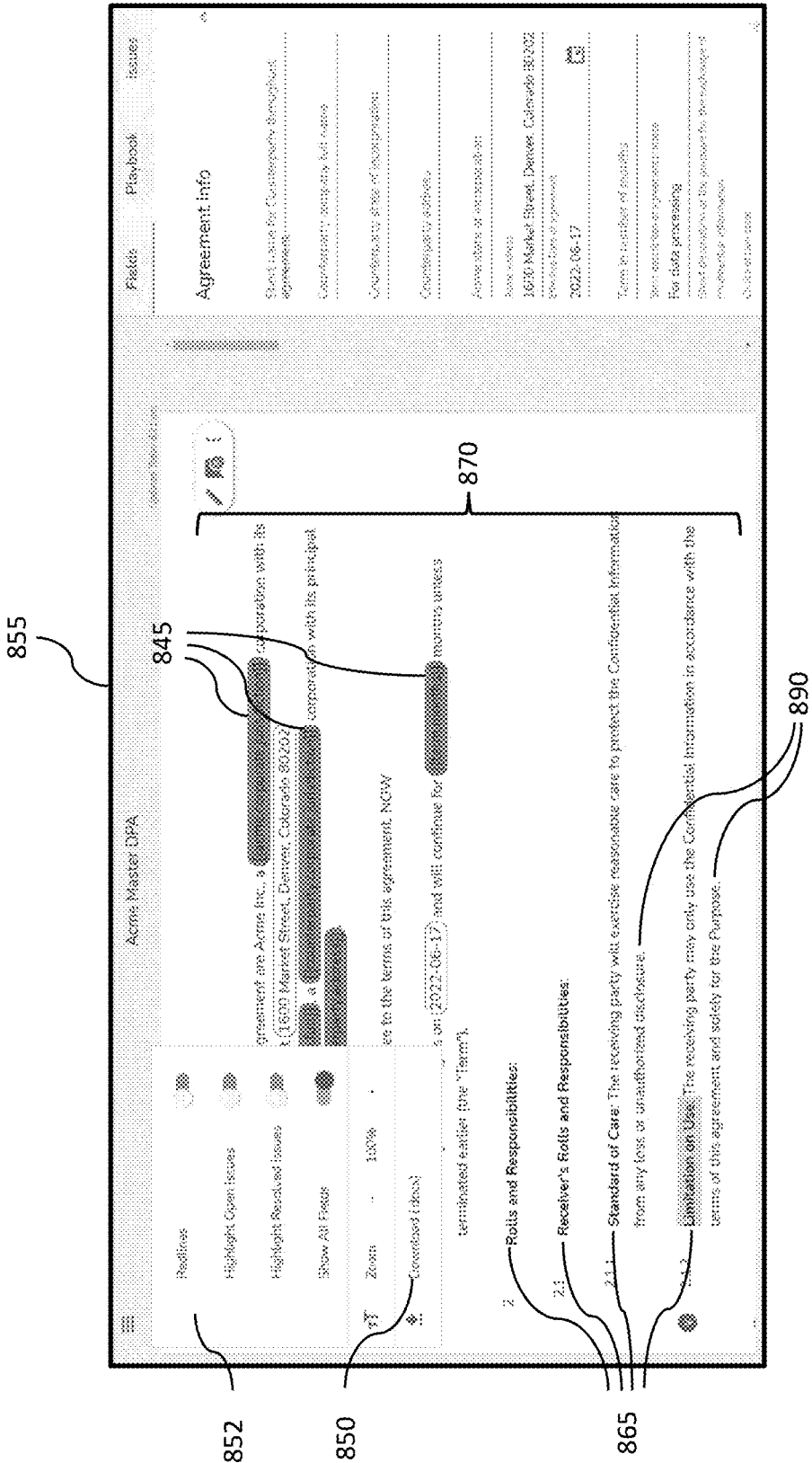
FIG. 11 is a diagram illustrating an exemplary or representative fifth GUI providing a plurality of search results organized within a selected template.

An example of the final search results 870, organized within the selected template 865, is illustrated in FIGS. 10 and 11. Also as illustrated in FIG. 10, the dynamic fields 845 have been filled in and completed, such as the names and addresses of parties, a start date, and a duration. For the purpose of showing how and where dynamic fields 845 may be utilized, as illustrated in FIG. 11, the dynamic fields 845 have not been completed. FIG. 11 also illustrates the drop down menu 852 of the GUI 855 for the user to download the final results (step 660).

FIG. 10 also illustrates the substantive search results ordered and arranged in the template 865, with each search result 870 arranged within a corresponding template location 890, and having classifications 880 determined by the selected compilation, which for FIG. 10 is a master data protection agreement ("Acme Master DPA"). Following with the example generic template discussed above, the template 865 in the GUI 840 illustrates the classifications 880 and ordering of the substantive search results in the template locations 890, along with numbering, font, styles, indentations, and so on, such as:

TITLE = "Acme Master DPA"
1 Classification 1 = "Agreement Terms":
  1.1 Classification 2 = "Parties":
    Phrase, paragraph, or clause mapped to Classification 2 = "The parties to this agreement are ...".
  1. 2 Classification 3 = "Agreement":
    Phrase, paragraph, or clause mapped to Classification 3 = "The parties agree ...".
  1. 3 Classification 4 = "Term":
    Phrase, paragraph, or clause mapped to Classification 4 = "This agreement begins on [dynamic field 815] and will continue for [dynamic field 815] ...".
2 Classification 5 = "Rolls and Responsibilities":
  2.1 Classification 6 = "Receiver's Rolls and Responsibilities":
    2.1.1 Classification 7 = "Standard of Care":
      Phrase, paragraph, or clause mapped to Classification 7 = "The receiving party will ...".
    2.1.2 Classification 8 = "Limitation on Use":
      Phrase, paragraph, or clause mapped to Classification 8 = "The receiving party may only ...".
\*\*\*

Those having skill in the art will recognize that the steps indicated in FIGS. 5 and 6 may be performed in a wide variety of orders, for example, and many of the steps and processes may be performed by the database generator 225 and the search engine 325 in parallel or multithreaded, particularly in multicore embodiments, such as the scoring of each phrase, paragraph, or clause may be assigned to a different core 312 in a multicore processor 310, or performed simultaneously and in parallel across different queries 705, 710 and corresponding return queries 715, 720 or for different users, with all such variations considered equivalent and within the scope of the present disclosure.

It should also be noted that the personalized search results and search result rankings may be subject to change. For example, when the search engine 325 is utilized to search for and generate a contract, that terms of the contract may vary during negotiations. The user may access the stored search results having the contract template, and as various clauses are negotiated, different versions or variants of each selected phrase, paragraph, or clause may be provided and selected, for example and without limitation.

In addition, as another aspect of the artificial intelligence of the representative embodiments, the search engine 325 may also suggest these various changes in the responses to the return queries 715, 720, to adjust the various preference parameters, with the search engine 325 then repeating the scoring, sorting and ranking processes, and generating a new set of personalized and ranked search results. It should also be noted that the personalized search results and search result rankings may be provided in a wide variety of ways, in addition to those illustrated. Also in a representative embodiment, a predetermined number of or all of the personalized search results and search result rankings may be output for review in step 635, and users may be provided with various options for the amount of results to be returned.

It should be noted that the output of the personalized search results and search result rankings is generally provided as a listing within the selected template for the selected compilation. It should be noted that such a listing or list may have any format of any kind, such as sequential, a chart, a sequence of links, etc., for example and without limitation. Any and all such listing or list formats or templates are considered equivalent and within the scope of the disclosure.

In summary, the representative embodiments provide a technical, artificial intelligence solution to an Internet-centric problem of over-inclusiveness and under-inclusiveness of search results and distorted rankings of search results using the prior art keyword searching. The representative embodiments automate the Internet-based searching and selection processes using highly relevant, user-determined characteristics and user-customizable parameters, resulting in personalization of search results and search result ranking. The representative embodiments employ artificial intelligence to "match" information to a user and provide with greater precision the information the user wants or needs (if available) at the point in time wanted or needed, without inundating the user with thousands of responses or documents which the user cannot possibly review in a reasonable or allocated time.

As a result, the representative embodiments improve the functioning of Internet-based searches, providing highly personalized search results and search result rankings, thereby dramatically decreasing the amount of search time required for a user to discover relevant and actionable information.

Similarly, the representative embodiments are also necessarily technical and improve the functioning of the Internet and networked computing devices as a whole, providing an artificial intelligence solution to this Internet-centric problem by enabling personalization of search results and search result ranking.

The representative embodiments provide comparatively granular search results within a selected or constrained context. The representative internet or network search embodiments return granular search results which can be directly compared, side-by-side, and used and selected by the user. The final, customized (user-selected) search results are then organized and output to the user based upon the customizable, user-selected template, thereby providing immediately useable and actionable search results.

Lastly, it should also be noted that the representative embodiments cannot merely be performed by hand or in the human mind. For example, the transformation of each of the thousands of parsed phrases, paragraphs, or clauses into corresponding 384-dimensional dense vectors (or other vector embeddings) is an insurmountable task for a human being. This insurmountable task is then compounded by the millions upon millions of calculations required to be performed to determine the cosine similarity (inner dot product) across thousands to millions of these 384-dimensional dense vectors, for all of the various combinations, and further, to periodically repeat all of these tasks for updating the first and second databases 220, 260, such as on daily basis. For example, with a vector database 260 having a comparatively small number of vectors, such as 1000 vectors, each calculation of cosine similarity between any two 384-dimensional dense vectors involves, at a minimum, 767 calculations. Performing these 767 calculations for each pair combination of the 1000 vectors results in over 383 million calculations. Assuming a human being can work extraordinarily rapidly and perform each calculation in 3 seconds (20 calculations/minute), and works nonstop for 8 hours each day, 365 days per year, results in over 39,000 days of calculations, or over 100 person-years of work, for a comparatively small database of only 1000 vectors, which, of course, would be updated daily in the usual course of business. This would require countless person-years of effort by countless people, which is an equally insurmountable task for time-sensitive information and requirements.

As used herein, a processor 210, 310, 405 (and for the processor 210, its incorporated parser and extractor 230, vector generator 235, mapping generator 240, lexical database generator 245, and semantic database generator 255, and for the processor 310, its incorporated return query generator 330, lexical comparator 335, scoring and ranking generator 340, and output generator 345) may be implemented using any type of digital or analog electronic or other circuitry which is arranged, configured, designed, programmed or otherwise adapted to perform any portion of the personalization and customization of search results and search result rankings functionality, described herein, including configured as one or more neural networks. As the term processor is used herein, a processor 210, 310, 405 may include use of a single integrated circuit ("IC"), or may include use of a plurality of integrated circuits or other electronic components connected, arranged or grouped together, such as processors, controllers, microprocessors, digital signal processors ("DSPs"), parallel processors, multiple core processors, custom ICs, application specific integrated circuits ("ASICs"), field programmable gate arrays ("FPGAs"), adaptive computing ICs, discrete electronic components, and any associated memory (such as RAM, DRAM and ROM), and other ICs and components, whether analog or digital. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits or discrete electronic components which perform the functions discussed above and further discussed below, and may further include any associated memory, such as microprocessor memory or additional RAM, DRAM, SDRAM, SRAM, MRAM, ROM, FLASH, EPROM or EPROM. A processor (such as processor 210, 310, 405), with any associated memory, may be arranged, adapted or configured (via programming, FPGA interconnection, or hard-wiring) to perform any portion of the personalization of search results and search result rankings of the present disclosure, as described herein. For example, the methodology may be programmed and stored, in a processor 210, 310, 405 with its associated memory (and/or memory 205, 305, 410, respectively) and other equivalent components, as a set of program instructions or other code (or equivalent configuration or other program) for subsequent execution when the processor 210, 310, 405 is operative (i.e., powered on and functioning). Equivalently, when the processor 210, 310, 405 may implemented in whole or part as FPGAs, custom ICs and/or ASICs, the FPGAs, custom ICs or ASICs also may be designed, configured and/or hard-wired to implement any portion of the personalization of search results and search result rankings of the present disclosure. For example, the processor 210, 310, 405 may be implemented as an arrangement of analog and/or digital circuits, controllers, microprocessors, DSPs and/or ASICs, collectively referred to as a "processor", which are respectively hard-wired, arranged, programmed, designed, adapted or configured to implement personalization of search results and search result rankings of the present disclosure, including possibly in conjunction with a memory 205, 305, 410.

The operations described in this disclosure can be implemented as operations performed by a data processing apparatus on data stored on one or more machine-readable storage devices or on data received from other sources. Server systems 200, 300 are examples of representative data processing apparatuses. As utilized herein, the terminology "data processing apparatus" encompasses any and all kinds of apparatus, devices, and machines for processing data, including by way of example a programmable processor (210, 310, 405), a computer, a server, a system on a chip ("SOC"), or combinations of such devices. The server systems 200, 300 can also include code (such as executable code) that creates an execution environment for a data processing apparatus, or other program, such as processor 210, 310 firmware, a protocol stack, a database (220, 260, 220A, 260A) management system, an operating system, a cross-platform runtime environment, a virtual machine, and/or combinations thereof, which may be utilized in a computer, server systems 200, 300, or other data processing apparatus.

A memory 205, 305, 410 and/or a data storage device 250 may be embodied as any type of data storage device, such as RAM, FLASH, DRAM, SDRAM, SRAM, MRAM, FeRAM, ROM, EPROM or E²PROM, and is utilized for data storage, and also may be utilized to store any program instructions or configurations which may be utilized by a processor 210, 310, 405. More specifically, the memory 205, 305, 410 and/or a data storage device 250 may be embodied in any number of forms, including within any nontransitory, machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 210, 310, 405 or processor IC), whether volatile or non-volatile, whether removable or non-removable, including without limitation RAM, FLASH, DRAM, SDRAM, SRAM, MRAM, FeRAM, ROM, EPROM or E²PROM, or any other form of memory or data storage device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 205, 305, 410 and/or a data storage device 250 may store data in any way or configuration, including as various look up tables, parameters, coefficients, databases, other information and data, programs or instructions (of the software of the present invention), and other types of tables such as database tables or any other form of data repository.

The network interface (I/O) circuits 215, 315, 415 may be implemented as known or may become known in the art, and may include impedance matching capability, voltage rectification circuitry, voltage translation for a low voltage processor to interface with a higher voltage control bus for example, various switching mechanisms (e.g., transistors) to turn various lines or connectors on or off in response to signaling from a processor 210, 310, 405, other control logic circuitry, and/or physical coupling mechanisms. In addition, the network interface (I/O) circuits 215, 315, 415 are also configured to receive and/or transmit signals externally to the server system 200, 300 and client device 400, 400A, respectively, such as through hard-wiring or RF signaling, for example, to receive and transmit information in real-time, such as queries 705, 710, return queries 715, 720, and personalized search results and search result rankings, also for example. The network interface (I/O) circuits 215, 315, 415 also may be stand-alone devices (e.g., modular). The network interface (I/O) circuits 215, 315, 415 are utilized for appropriate connection to a relevant channel, network or bus; for example, the network interface (I/O) circuits 215, 315, 415 may provide impedance matching, drivers and other functions for a wireline interface, may provide demodulation and analog to digital conversion for a wireless interface, and may provide a physical interface for the memory 205, 305, 410 with other devices. In general, the network interface (I/O) circuits 215, 315, 415 are used to receive and transmit data, depending upon the selected embodiment, such as queries 705, 710, return queries 715, 720, and personalized search results and search result rankings, control messages, authentication data, profile information, and other pertinent information.

As indicated above, the processor 205, 305, 410 is hard-wired, configured or programmed, using software and data structures of the invention, for example, to perform any portion of the automated personalization of search results and search result rankings, of the present disclosure. As a consequence, the system and method of the present disclosure may be embodied as software which provides such programming or other instructions, such as a set of instructions and/or metadata embodied within a nontransitory computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Python, Javascript, Adobe Flash, Silverlight, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, "software", "program", "computer program", or a "module", "program module", "software module", as used equivalently herein, means and refers to any programming language, of any kind, with any syntax or signatures, which provides or can be interpreted to provide the associated functionality or methodology specified (when instantiated or loaded into a processor or computer and executed, including the processor 205, 305, 410, for example). In addition, any of such program or software modules may be combined or divided in any way. For example, a larger module combining first and second functions is considered equivalent to a first module which performs the first function and a separate second module which performs the second function.

For example, a computer program (e.g., a program, software, software application, script, or code) can be written in any form of programming language, including compiled, interpreted, declarative, or procedural languages. Such a program may be implemented in any form, including as a stand-alone program or as a module, component, subroutine, object, or other construct which may be used in a computing environment, and may be stored as a file, a file system, multiple files, or portion of a file which includes other programs or data, such as a script stored in a markup language document, and may be executed on one or more computers, servers 300, or other data processing apparatus that are co-located or distributed across multiple locations and interconnected by a network such as network or internet 110.

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 205, 305, 410, e.g., a memory IC, a floppy disk, a CDROM, a CD-RW, a DVD, a magnetic hard drive, an optical drive, or any other type of data storage apparatus or medium, as mentioned above.

In addition to the server systems 200, 300 illustrated in FIGS. 2 and 3, those having skill in the art will recognize that there are innumerable equivalent configurations, layouts, kinds and types of server and control circuitry known in the art, which are within the scope of the present invention.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. One having skill in the art will further recognize that additional or equivalent method steps may be utilized, or may be combined with other steps, or may be performed in different orders, any and all of which are within the scope of the claimed invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A computer server system coupleable to a network for personalization of network search results and search result rankings provided to a user, the server system comprising:
   a network input and output interface for network data transmission and reception, the network input and output interface configured to receive an input query from the user via the network; to transmit a return query, of a plurality of return queries, to the user via the network; to receive a response to the return query from the user via the network; and to transmit search results to the user via the network;
   at least one data storage device configured to store a first, lexical database having one or more compilations, one or more templates, and the plurality of return queries; each compilation of the one or more compilations comprising a plurality of parsed phrases, paragraphs, or clauses; and each template of the one or more templates comprising a plurality of classifications having a predetermined order; and
   one or more processors coupled to the at least one data storage device and to the network input and output interface, the one or more processors configured to access the first database and using the input query, to select the return query for transmission; to search a selected compilation of the one or more compilations stored in the first database using the input query to generate a first plurality of initial search results; to comparatively score each selected parsed phrase, paragraph, or clause of the first plurality of initial search results, for each classification of a selected template and a selected compilation, and to output the first plurality of initial search results arranged according to the plurality of classifications and the predetermined order of the selected template.

2. The computer server system of claim 1, wherein the one or more processors are further configured to output the first plurality of initial search results with the highest matching or highest scoring search results, for each classification of the plurality of classifications, ranked as primary search results within the template, and any remaining matching search results provided, for each classification of the plurality of classifications, as a plurality of variants or versions for side-by-side comparison.

3. The computer server system of claim 1, wherein the network input and output interface is further configured to receive a plurality of user selections of search results from among the initial search results.

4. The computer server system of claim 3, wherein the one or more processors are further configured to generate, for transmission by the network input and output interface to the user, a set of final user-selected search results arranged according to the plurality of classifications and the predetermined order of the selected template.

5. The computer server system of claim 4, wherein the first plurality of initial search results and the set of final user-selected search results have a user-selected level of granularity.

6. The computer server system of claim 4, wherein the one or more processors are further configured to generate, for transmission by the network input and output interface to the user, a downloadable file having the set of final user-selected search results arranged according to the plurality of classifications and the predetermined order of the selected template.

7. The computer server system of claim 1, wherein the at least one data storage device is further configured to store a second, semantic database having a plurality of multi-dimensional vectors, each multi-dimensional vector of the plurality of multi-dimensional vectors corresponding to a selected parsed phrase, paragraph, or clause of the plurality of parsed phrases, paragraphs, or clauses.

8. The computer server system of claim 7, wherein the one or more processors are further configured to transform the input query into a corresponding multi-dimensional vector and to search the second, semantic database for semantic similarity to the corresponding multi-dimensional vector, and generate a second plurality of initial search results.

9. The computer server system of claim 8, wherein the semantic similarity is determined as a cosine similarity or cosine distance between a first multi-dimensional vector u and a second multi-dimensional vector v, of the plurality of multi-dimensional vectors, as an inner dot product between the first and second multi-dimensional vectors calculated as: $u \cdot v = |u||v|\cos\theta = \sum_{i=1}^{n} a_n b_n$.

10. The computer server system of claim 8, wherein the one or more processors are further configured to transform the second plurality of initial search results from a vector representation to a corresponding plurality of parsed phrases, paragraphs, or clauses and include the corresponding plurality of parsed phrases, paragraphs, or clauses in the first plurality of initial search results.

11. The computer server system of claim 1, wherein the one or more processors are further configured to transform each parsed phrase, paragraph, or clause, of the plurality of parsed phrases, paragraphs, or clauses, into a corresponding multidimensional vector to form a plurality of multi-dimensional vectors and to store the plurality of multi-dimensional vectors in a second, semantic database in the at least one data storage device.

12. The computer server system of claim 11, wherein the one or more processors are further configured to determine semantic similarity of each multi-dimensional vector of the plurality of multi-dimensional vectors to all other multi-dimensional vectors of the plurality of multi-dimensional vectors of the second, semantic database to generate, for each classification of the plurality of classifications, a plurality of semantically similar multi-dimensional vectors.

13. The computer server system of claim 12, wherein the one or more processors are further configured to transform the plurality of semantically similar multi-dimensional vectors from a vector representation to a corresponding plurality of semantically similar parsed phrases, paragraphs, or clauses and include the corresponding plurality of semantically similar parsed phrases, paragraphs, or clauses in the first, lexical database, for each classification of the plurality of classifications.

14. The computer server system of claim 13, wherein the search of the selected compilation of the one or more compilations stored in the first, lexical database includes searching the corresponding plurality of semantically similar parsed phrases, paragraphs, or clauses to generate the first plurality of initial search results.

15. The computer server system of claim 1, wherein the network input and output interface is further configured to receive input data for a selected compilation of the one or more compilations, and wherein the one or more processors are further configured to parse the input data into the plurality of parsed phrases, paragraphs, or clauses; to map the plurality of parsed phrases, paragraphs, or clauses to the plurality of classifications; and to generate the first, lexical database having the mapped plurality of parsed phrases, paragraphs, or clauses for the selected compilation.

16. The computer server system of claim 1, wherein the one or more processors are further configured to recognize a plurality of dynamic fields and extract dynamic content from the plurality of parsed phrases, paragraphs, or clauses.

17. The computer server system of claim 15, wherein the one or more processors are further configured to extract the plurality of classifications from the input data.

18. The computer server system of claim 1, wherein the one or more processors are further configured to generate metadata for each parsed phrase, paragraph, or clause of the plurality of parsed phrases, paragraphs, or clauses, the metadata comprising one or more types of data selected from the group consisting of: an order, a name, a font, a style, a header, a footer, a weighting, a tagging of one or more variants, a confidence level, a template designation, a compilation designation, a placeholder, a cross-reference, an inline references, and combinations thereof.

19. A computer server-implemented method for personalization of network search results and search result rankings provided to a user, the method comprising:

using the computer server, receiving an input query from the user via a network;

in response to the input query, using the computer server, accessing at least one data storage device and selecting a return query, of a plurality of return queries;

using the computer server, transmitting the return query to the user via the network;

using the computer server, receiving a response to the return query from the user via the network;

using the computer server, accessing a first, lexical database and using the input query, searching a selected compilation of one or more compilations stored in the first, lexical database to generate a first plurality of initial search results, each compilation of the one or more compilations comprising a plurality of parsed phrases, paragraphs, or clauses;

using the computer server, comparatively scoring each selected parsed phrase, paragraph, or clause of the first plurality of initial search results, for each classification of a plurality of classifications of a selected template of one or more templates stored in the first, lexical database; and using the computer server, outputting the first plurality of initial search results arranged according to the plurality of classifications and a predetermined order of the selected template.

20. The computer server-implemented method of claim 19, further comprising:

using the computer server, outputting the first plurality of initial search results with the highest matching or highest scoring search results, for each classification of the plurality of classifications, ranked as primary search results within the template, and providing any remaining matching search results, for each classification of the plurality of classifications, as a plurality of variants or versions for side-by-side comparison.

21. The computer server-implemented method of claim 19, further comprising:

using the computer server, receiving a plurality of user selections of search results from among the initial search results.

22. The computer server-implemented method of claim 21, further comprising:

using the computer server, generating and transmitting to the user a set of final user-selected search results arranged according to the plurality of classifications and the predetermined order of the selected template.

23. The computer server-implemented method of claim 22, wherein the first plurality of initial search results and the set of final user-selected search results have a user-selected level of granularity.

24. The computer server-implemented method of claim 22, further comprising:

using the computer server, generating and transmitting to the user a downloadable file having the set of final user-selected search results arranged according to the plurality of classifications and the predetermined order of the selected template.

25. The computer server-implemented method of claim 19, further comprising:

using the computer server, mathematically transforming the input query into a corresponding multi-dimensional vector of a plurality of multi-dimensional vectors stored in a second, semantic database, each multi-dimensional vector of the plurality of multi-dimensional vectors corresponding to a selected parsed phrase, paragraph, or clause of the plurality of parsed phrases, paragraphs, or clauses; and using the computer server, searching the second, semantic database for semantic similarity to the corresponding multi-dimensional vector and generating a second plurality of initial search results.

26. The computer server-implemented method of claim 25, further comprising:

using the computer server, determining the semantic similarity as a cosine similarity or cosine distance between a first multi-dimensional vector u and a second multi-dimensional vector v, of the plurality of multi-dimensional vectors, as an inner dot product between the first and second multi-dimensional vectors calculated as: $u \cdot v = |u||v|\cos\theta = \Sigma hu\ n_{i=1}\ a_n b_n$.

27. The computer server-implemented method of claim 25, further comprising:

using the computer server, transforming the second plurality of initial search results from a vector representation to a corresponding plurality of parsed phrases, paragraphs, or clauses and including the corresponding plurality of parsed phrases, paragraphs, or clauses in the first plurality of initial search results.

28. The computer server-implemented method of claim 19, further comprising:
using the computer server, mathematically transforming each parsed phrase, paragraph, or clause, of the plurality of parsed phrases, paragraphs, or clauses, into a corresponding multidimensional vector to form a plurality of multi-dimensional vectors and to store the plurality of multi-dimensional vectors in a second, semantic database in the at least one data storage device.

29. The computer server-implemented method of claim 28, further comprising:
using the computer server, determining a semantic similarity of each multi-dimensional vector of the plurality of multi-dimensional vectors to all other multi-dimensional vectors of the plurality of multi-dimensional vectors of the second, semantic database and generating, for each classification of the plurality of classifications, a plurality of semantically similar multi-dimensional vectors.

30. The computer server-implemented method of claim 29, further comprising:
using the computer server, transforming the plurality of semantically similar multi-dimensional vectors from a vector representation to a corresponding plurality of semantically similar parsed phrases, paragraphs, or clauses and including the corresponding plurality of semantically similar parsed phrases, paragraphs, or clauses in the first, lexical database, for each classification of the plurality of classifications.

31. The computer server-implemented method of claim 30, wherein the search of the selected compilation of the one or more compilations stored in the first, lexical database includes searching the corresponding plurality of semantically similar parsed phrases, paragraphs, or clauses to generate the first plurality of initial search results.

32. The computer server-implemented method of claim 19, further comprising:
using the computer server, receiving input data for a selected compilation of the one or more compilations;
using the computer server, parsing the input data into the plurality of parsed phrases, paragraphs, or clauses;
using the computer server, mapping the plurality of parsed phrases, paragraphs, or clauses to the plurality of classifications; and
using the computer server, generating the first, lexical database having the mapped plurality of parsed phrases, paragraphs, or clauses for the selected compilation.

33. The computer server-implemented method of claim 32, further comprising:
using the computer server, recognizing a plurality of dynamic fields and extracting dynamic content from the plurality of parsed phrases, paragraphs, or clauses.

34. The computer server-implemented method of claim 19, further comprising:
using the computer server, extracting the plurality of classifications from the input data.

35. The computer server-implemented method of claim 19, further comprising:
using the computer server, generating metadata for each parsed phrase, paragraph, or clause of the plurality of parsed phrases, paragraphs, or clauses, the metadata comprising one or more types of data selected from the group consisting of: an order, a name, a font, a style, a header, a footer, a weighting, a tagging of one or more variants, a confidence level, a template designation, a compilation designation, a placeholder, a cross-reference, an inline reference, and combinations thereof.

36. A computer server system coupleable to a network for personalization of network search results and search result rankings provided to a user, the server system comprising:
a network input and output interface for network data transmission and reception, the network input and output interface configured to receive an input query from the user via the network; to transmit a return query, of a plurality of return queries, to the user via the network; to receive a response to the return query from the user via the network; to transmit a first plurality of initial search results to the user via the network; to receive a plurality of user selections of search results from among the first plurality of initial search results; and to transmit a set of final user-selected search results to the user via the network;
at least one data storage device configured to store a first, lexical database having one or more compilations, one or more templates, and the plurality of return queries; each compilation of the one or more compilations comprising a plurality of parsed phrases, paragraphs, or clauses; and each template of the one or more templates comprising a plurality of classifications having a predetermined order; and
one or more processors coupled to the at least one data storage device and to the network input and output interface, the one or more processors configured to access the first database and using the input query, to select the return query for transmission; to search a selected compilation of the one or more compilations stored in the first database using the input query to generate a first plurality of initial search results; to comparatively score each selected parsed phrase, paragraph, or clause of the first plurality of initial search results, for each classification of a selected template and a selected compilation, and to output the first plurality of initial search results arranged according to the plurality of classifications and the predetermined order of the selected template with the highest matching or highest scoring search results, for each classification of the plurality of classifications, ranked as primary search results within the template, and any remaining matching search results provided, for each classification of the plurality of classifications, as a plurality of variants or versions for side-by-side comparison;
and to generate, for transmission by the network input and output interface to the user, a set of final user-selected search results arranged according to the plurality of classifications and the predetermined order of the selected template.

* * * * *